US011277616B2

(12) United States Patent
Ramasubramonian et al.

(10) Patent No.: US 11,277,616 B2
(45) Date of Patent: Mar. 15, 2022

(54) DC INTRA MODE PREDICTION IN VIDEO CODING

(71) Applicant: QUALCOMM Incorporated, San Diego, CA (US)

(72) Inventors: Adarsh Krishnan Ramasubramonian, Irvine, CA (US); Geert Van der Auwera, Del Mar, CA (US); Luong Pham Van, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/905,352

(22) Filed: Jun. 18, 2020

(65) Prior Publication Data

US 2020/0404281 A1 Dec. 24, 2020

Related U.S. Application Data

(60) Provisional application No. 62/866,325, filed on Jun. 25, 2019, provisional application No. 62/864,422, filed on Jun. 20, 2019.

(51) Int. Cl.
*H04N 19/132* (2014.01)
*H04N 19/105* (2014.01)
(Continued)

(52) U.S. Cl.
CPC ......... *H04N 19/132* (2014.11); *H04N 19/105* (2014.11); *H04N 19/159* (2014.11); *H04N 19/176* (2014.11); *H04N 19/70* (2014.11)

(58) Field of Classification Search
CPC .... H04N 19/132; H04N 19/70; H04N 19/105; H04N 19/176; H04N 19/159
See application file for complete search history.

(56) References Cited

U.S. PATENT DOCUMENTS 9,693,054 B2 * 6/2017 Jeon ........................ H04N 19/11
2018/0255295 A1 * 9/2018 Lee ........................ H04N 19/117
(Continued)

FOREIGN PATENT DOCUMENTS

WO  WO-2017190288 A1 * 11/2017 ........... H04N 19/105
WO      2019221472 A1    11/2019

OTHER PUBLICATIONS

Bross et al., "Versatile Video Coding (Draft 5)", Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1001-v8, 399 Pages, XP030212626, Retrieved from the Internet: (Year: 2019).*
(Continued)

*Primary Examiner* — Richard A Hansell, Jr.
(74) *Attorney, Agent, or Firm* — Shumaker & Sieffert, P.A.

(57) ABSTRACT

The disclosure describes examples for determining samples to use for DC intra mode prediction, such as where the samples are in a row or column that is not immediately above or immediately left of the current block. The samples may be aligned with the current block such that a last sample in the samples in a row above the current block is in same column as last column of the current block and such that a last sample in the samples in a column left of the current block is in the same row as the last row of the current block.

24 Claims, 20 Drawing Sheets

(51) Int. Cl.
*H04N 19/159* (2014.01)
*H04N 19/176* (2014.01)
*H04N 19/70* (2014.01)

(56) References Cited

U.S. PATENT DOCUMENTS

| | | | |
|---|---|---|---|
| 2018/0332284 A1 | 11/2018 | Liu et al. | |
| 2019/0141318 A1* | 5/2019 | Li | H04N 19/159 |
| 2020/0154100 A1* | 5/2020 | Zhao | H04N 19/159 |
| 2020/0186820 A1* | 6/2020 | Park | H04N 19/423 |

OTHER PUBLICATIONS

XP030219540, 5 pages, Retrieved from the Internet: URL: http://phenix.int-evry .fr/jvet/doc_end_user/documents/15_Gothenburg/wg11/JVET-O0426-v1.zip JVET-O0426-v1.docx [retrieved on 2891-86-25] abstract Section 1 Introduction Section 2 Proposal Section 4 Changes to the "Specification." (Year: 2019).*

Cited in the Application Section [3.2.2 Partitioning of the CTUs Using a Tree Structure], Section [3.2.5 "Virtual pipeline data units (VPDUs)], 48 pages." (Year: 2018).*

Bossen F., et al., "Non-CE3: A Unified Luma Intra Mode list Construction Process", Joint Video Experts Team (JVET) of ITU-T SG 16 WP 3 and ISO/IEC JTC 1/SC 29/WG 11, Document: JVET-M0528-r1, 13th Meeting: Marrakech, MA, Jan. 9-18, 2019, pp. 1-4.

Bross B., et al., "Versatile Video Coding (Draft 3)", Joint Video Experts Team (JVET) of ITU-T SG 16 WP 3 and ISO/IEC JTC 1/SC 29/WG 11, 12th Meeting: Macao, CN, JVET-L1001-v9, Oct. 3-12, 2018, 235 pp.

Bross B., et al., "Versatile Video Coding (Draft 6)", 127. MPEG Meeting, Jul. 8, 2019-Jul. 12, 2019, Gothenburg, (Motion Picture Expert Group or ISO/IEC JTC1/SC29/WG11), No. m49908, JVET-O2001-vE, Jul. 15, 2019 (Jul. 15, 2019), XP030208562, 455 Pages, Retrieved from the Internet: URL:http://phenix.int-evry.fr/mpeg/doc_end_user/documents/127_Gothenburg/wg11/m49908-JVET-O2001-v8-JVET-O2001-v8.zip JVET-O2001-v8.docx [retrieved on Jul. 15, 2019], abstract section 7.3.8.5.

Bross et al., "Versatile Video Coding (Draft 9)", Joint Video Experts Team (JVET) of ITU-T SG 16 WP 3 and ISO/IEC JTC 1/SC 29/WG 11, 18th Meeting: by teleconference, Apr. 15-24, 2020, Document: JVET-R2001-v8, 528 Pages.

Chen J., et al., "Algorithm description for Versatile Video Coding and Test Model 2 (VTM 2)", Joint Video Experts Team (JVET) of ITU-T SG 16 WP 3 and ISO/IEC JTC 1/SC 29/WG 11, JVET-K1002-v2, 11th Meeting: Ljubljana, SI, Jul. 10-18, 2018, pp. 1-21.

Chen J., et al., "Algorithm Description of Joint Exploration Test Model 1," 1, JVET Meeting, Oct. 19-21, 2015, Geneva;(The Joint Video Exploration Team of ISO/IEC JTC1/SC29/WG11 and ITU-T SG.16 ); URL: HTTP://PHENIX.INT-EVRY.FR/JVET/ ,, No. JVET-A1001 Feb. 24, 2016 (Feb. 24, 2016), XP030150000, 27 pages.

Hernandez S., et al., "CE3: Intra Sub-Partitions Coding Mode (Tests 1.1.1 and 1.1.2)", Joint Video Experts Team (JVET) of ITU-T SG 16 WP 3 and ISO/IEC JTC 1/SC 29/WG 11, Document: JVET-M0102-V5, 13th Meeting: Marrakech, MA, Jan. 9-18, 2019, pp. 1-9.

Hernández S-D., et al., "CE3: Line-based intra coding mode (Tests 2.1.1 and 2.1.2)", 12th JVET Meeting, Oct. 3, 2018-Oct. 12, 2018, Macao, CN, (The Joint Video Exploration Team Of ISO/IEC JTC1/SC29/WG11 and ITU-T SG.16), No. JVET-L0076-V2, Fraunhofer HHI, pp. 1-10, Retrieved from the Internet: URL: http://phenix.int-evry.fr/jvet/doc_end_user/documents/12_Macao/wg11/JVET-L0076-v2.zip. [retrieved on Sep. 30, 2018].

International Search Report and Written Opinion—PCT/US2020/038602—ISA/EPO—dated Sep. 21, 2020 (17 pp).

ITU-T H.265, "Series H: Audiovisual and Multimedia Systems, Infrastructure of Audiovisual Services—Coding of Moving Video, High efficiency Video Coding," The International Telecommunication Union, Dec. 2016, 664 Pages.

Yao J., et al., "Non-CE3: Intra Prediction Information Coding", JVET-M0210-V3, Joint Video Experts Team (JVET) of ITU-T SG 16 WP 3 and ISO/IEC JTC 1/SC 29/WG 11, 13th Meeting: Marrakech, MA, Jan. 9 -18, 2019, JVET-M0210-r2, pp. 1-7.

Zhao L., et al., "CE3-related: Unification of Angular Intra Prediction for Square and Non-square Blocks," 12, JVET Meeting, Oct. 3, 2018-Oct. 12, 2018, Macao, (The Joint Video Exploration Team of ISO/IEC JTC1/SC29/WG11 and ITU-T SG.16), No. JVET-L0279, Oct. 6, 2018 (Oct. 6, 2018), XP030195082, pp. 1-10, Retrieved from the Internet: URL: http://phenix.int-evry.fr/jvet/doc_end_user/documents/12_Macao/wg11/JVET-L0279-v3.zip JVET-L0279-v1.docx [retrieved on Oct. 6, 2018] cited in the application the whole document.

* cited by examiner

| predModeIntra | -10 | -9 | -8 | -7 | -6 | -5 | -4 | -3 | -2 | -1 | | | | |
| --- | --- | --- | --- | --- | --- | --- | --- | --- | --- | --- | --- | --- | --- | --- |
| intraPredAngle | 128 | 102 | 86 | 73 | 64 | 57 | 51 | 45 | 39 | 35 | 32 | | | |
| predModeIntra | 9 | 10 | 11 | 12 | 13 | 14 | 15 | 16 | 17 | 18 | 19 | 20 | 21 | 22 |
| intraPredAngle | 9 | 10 | 11 | 12 | 13 | 14 | 15 | 16 | 17 | 18 | 19 | 20 | 21 | 22 |
| predModeIntra | 14 | 13 | 12 | 11 | 10 | 9 | 8 | 7 | 6 | 5 | 4 | 3 | 2 | 1 |
| intraPredAngle | 26 | 27 | 28 | 29 | 30 | 31 | 32 | 33 | 34 | 35 | 36 | 37 | 38 | 39 |
| predModeIntra | -12 | -13 | -14 | -15 | -16 | -17 | -18 | -19 | -20 | -21 | -22 | -23 | -24 | -25 |
| intraPredAngle | 43 | 44 | 45 | 46 | 47 | 48 | 49 | 50 | 51 | 52 | 53 | 54 | 55 | 56 |
| predModeIntra | -10 | -9 | -8 | -7 | -6 | -5 | -4 | -3 | -2 | -1 | 0 | 1 | 2 | 3 |
| intraPredAngle | 60 | 61 | 62 | 63 | 64 | 65 | 66 | 67 | 68 | 69 | 70 | 71 | 72 | 73 |
| predModeIntra | 16 | 18 | 20 | 23 | 26 | 29 | 32 | 35 | 39 | 45 | 51 | 57 | 64 | 73 |
| intraPredAngle | 77 | 78 | 79 | 80 | | | | | | | | | | |
| predModeIntra | 171 | 256 | 341 | 512 | | | | | | | | | | |

FIG. 10

DC INTRA MODE PREDICTION IN VIDEO CODING

RELATED APPLICATION

This application claims the benefit of U.S. Provisional Patent Application 62/864,422, filed Jun. 20, 2019 and U.S. Provisional Patent Application 62/866,325, filed Jun. 25, 2019, the entire content of each of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for DC intra mode prediction, including improvements to determining samples for DC intra mode prediction. For instance, in one or more examples, for DC intra mode prediction, a video coder (e.g., video encoder or video decoder) may utilize one or more samples in a row or column that is not immediately adjacent to a current block being coded (e.g., encoded or decoded). This disclosure describes example techniques in which the samples in the non-adjacent row or column are aligned with the current block.

As one example, samples of a non-adjacent row are aligned with the current block when the last sample in the non-adjacent row has the same x-coordinate as the last column of the current block. As one example, samples of a non-adjacent column are aligned with the current block when the last sample in the non-adjacent column has the same y-coordinate as the last row of the current block. In some examples, the first sample in the non-adjacent row has the same x-coordinate as the first column of the current block, and the first sample in the non-adjacent column as the same y-coordinate as the first row of the current block.

By utilizing samples from non-adjacent rows or columns that are aligned with the current block, there may be improvements in the video coding process. As one example, for DC intra mode prediction, the samples from non-adjacent rows or columns that are aligned with the current block may generally form a better prediction block (e.g., in terms for smaller residual values) than samples from non-adjacent rows or columns that are not aligned.

Moreover, there may be memory bandwidth benefits. If the aligned samples are used for DC intra mode prediction, then circuitry for performing DC intra mode prediction need not fetch samples that are to the top-left of the current block for DC intra mode prediction with non-adjacent rows or columns. Since fetching happens in chunks, not accessing top-left samples may be beneficial in reducing the amount of data that is read. Accordingly, in some examples, there may be computational efficiencies due to the video coder accessing fewer samples from memory for DC intra mode prediction. In this way, the example techniques described in this disclosure provide a technical solution to a technical problem that improve the operations of a video coder and video coding process with practical application for applying DC intra prediction on a current block.

In one example, the disclosure describes a method of decoding video data, the method comprising determining samples to use for DC intra mode prediction for a current block, wherein determining the samples comprises determining a plurality of samples in at least one of: a non-adjacent row of samples having a last sample that is in the same column as a last column of the current block, wherein the non-adjacent row of samples is more than one row above the current block, or a non-adjacent column of samples having a last sample that is in the same row as a last row of the current block, wherein the non-adjacent column of samples is more than one column left of the current block, and decoding the current block using DC intra mode prediction using the determined samples.

In one example, the disclosure describes a method of encoding video data, the method comprising determining samples to use for DC intra mode prediction for a current block, wherein determining the samples comprises determining a plurality of samples in at least one of: a non-adjacent row of samples having a last sample that is in the same column as a last column of the current block, wherein the non-adjacent row of samples is more than one row above the current block, or a non-adjacent column of samples having a last sample that is in the same row as a last row of the current block, wherein the non-adjacent column of samples is more than one column left of the current block, and encoding the current block using DC intra mode prediction using the determined samples.

In one example, the disclosure describes a device for decoding video data, the device comprising memory configured to store one or more samples of rows and columns that are non-adjacent to a current block and processing circuitry configured to determine samples to use for DC intra mode prediction for a current block, wherein to determine the samples, the processing circuitry is configured to determine a plurality of samples in at least one of: a non-adjacent row of samples having a last sample that is in the same column as a last column of the current block, wherein the non-adjacent row of samples is more than one row above the current block, or a non-adjacent column of samples having a last sample that is in the same row as a last row of the current block, wherein the non-adjacent column of samples is more than one column left of the current block, and decode the current block using DC intra mode prediction using the determined samples.

In one example, the disclosure describes a device for encoding video data, the device comprising memory configured to store one or more samples of rows and columns that are non-adjacent to a current block and processing circuitry configured to determine samples to use for DC intra mode prediction for a current block, wherein to determine the samples, the processing circuitry is configured to determine a plurality of samples in at least one of: a non-adjacent row of samples having a last sample that is in the same column as a last column of the current block, wherein the non-adjacent row of samples is more than one row above the current block, or a non-adjacent column of samples having a last sample that is in the same row as a last row of the current block, wherein the non-adjacent column of samples is more than one column left of the current block, and encode the current block using DC intra mode prediction using the determined samples.

In one example, the disclosure describes a computer-readable storage medium storing instructions thereon that when executed cause one or more processors to determine samples to use for DC intra mode prediction for a current block, wherein the instructions that cause the one or more processors to determine the samples comprise instructions that cause the one or more processors to determine a plurality of samples in at least one of: a non-adjacent row of samples having a last sample that is in the same column as a last column of the current block, wherein the non-adjacent row of samples is more than one row above the current block, or a non-adjacent column of samples having a last sample that is in the same row as a last row of the current block, wherein the non-adjacent column of samples is more than one column left of the current block, and decode the current block using DC intra mode prediction using the determined samples.

In one example, the disclosure describes a device for decoding video data, the device comprising means for determining samples to use for DC intra mode prediction for a current block, wherein the means for determining the samples comprises means for determining a plurality of samples in at least one of: a non-adjacent row of samples having a last sample that is in the same column as a last column of the current block, wherein the non-adjacent row of samples is more than one row above the current block, or a non-adjacent column of samples having a last sample that is in the same row as a last row of the current block, wherein the non-adjacent column of samples is more than one column left of the current block, and means for decoding the current block using DC intra mode prediction using the determined samples.

The details of one or more examples are set forth in the accompanying drawings and the description below. Other features, objects, and advantages will be apparent from the description, drawings, and claims.

BRIEF DESCRIPTION OF DRAWINGS

FIG. 10 is a mapping table for determining angular angles for intra prediction.

DETAILED DESCRIPTION

Figure 1:
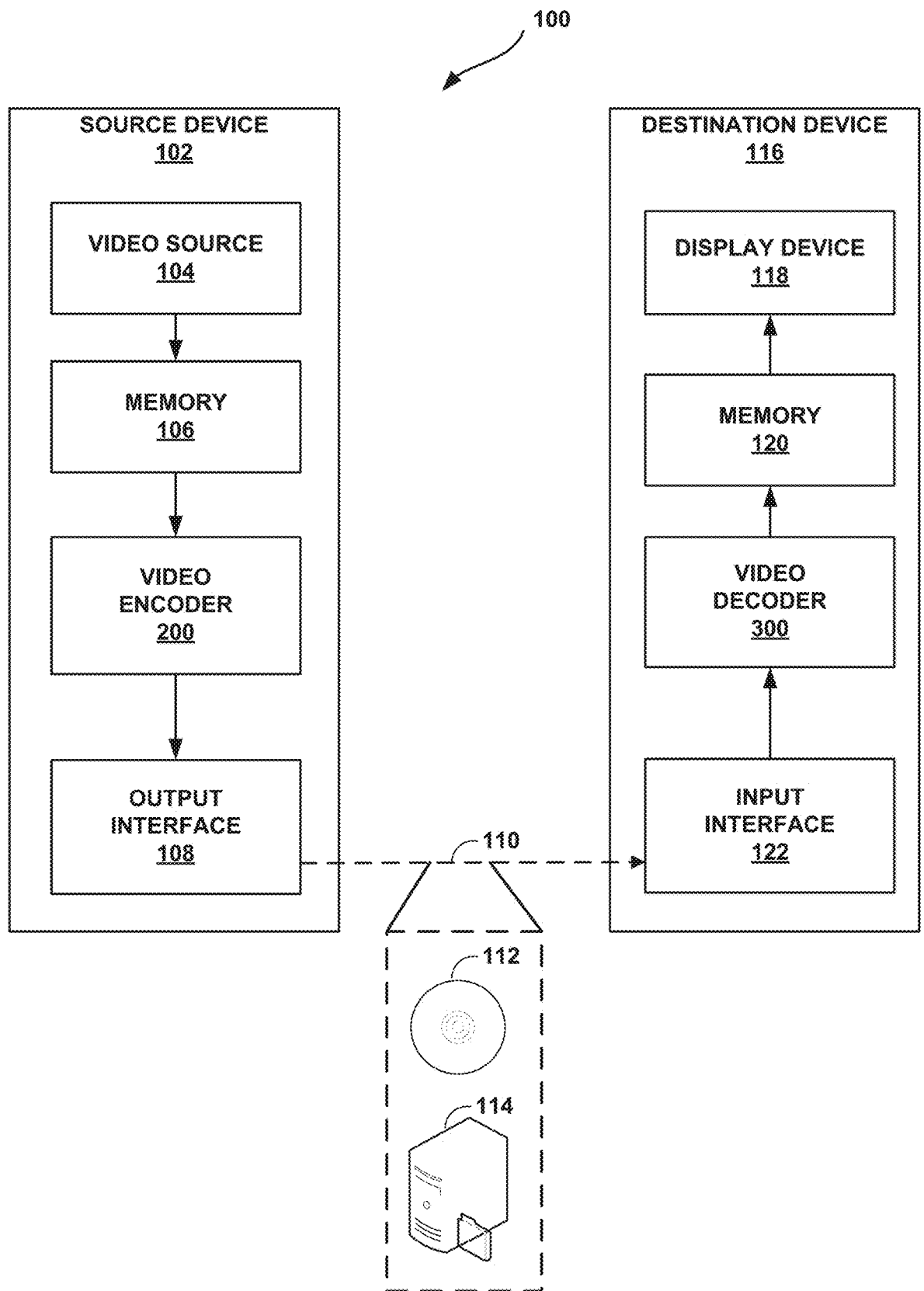
FIG. 1 is a block diagram illustrating an example video encoding and decoding system that may perform the techniques of this disclosure.

In video coding, a video encoder generates a prediction block for a current block and determines a residual block (e.g., difference) between the current block and the prediction block. The video encoder signal information indicative of the residual block and prediction mode information indicative of a way in which the video encoder generated the prediction block. A video decoder receives the information of the residual block and the prediction mode information. The video decoder generates the prediction block based on the prediction mode information so that the prediction block generated by the video decoder is same as the prediction block generated by the video encoder. The video decoder adds the prediction block to the residual block to reconstruct the current block.

One example of the prediction mode is a DC intra prediction mode. In DC intra prediction mode, a video coder (e.g., video encoder and/or video decoder) generates the prediction block using samples in the same picture as the current block. For example, for DC intra prediction mode, the video coder may utilize samples in an adjacent row (e.g., row just above) and/or adjacent column (e.g., column just left) of the current block to generate the prediction block.

In some examples, the DC intra prediction mode utilizes samples from a non-adjacent column or row. As one example, a non-adjacent row of samples is more than one row above the current block, and a non-adjacent column of samples is more than one column left of the current block.

As another example, a non-adjacent row of samples is more than three rows above the current block, and a non-adjacent column of samples is more than three columns left of the current block. As another example, a non-adjacent row of samples is more than two rows above the current block, and a non-adjacent column of samples is more than two columns left of the current block.

The video encoder may signal information that the video decoder receives indicative of which row and/or column to use for DC intra prediction. For instance, the information may indicate whether samples in a row and/or column that is adjacent to the current block is to be used for DC intra prediction, whether samples in a row and/or column that are one row or one column distant from the current block (e.g., one example of non-adjacent row or column), or whether samples in a row and/or column that are three rows or three columns distant from the current block (e.g., another example of non-adjacent row or column). In another instance, the information may indicate whether samples in a row and/or column that is adjacent to the current block is to be used for DC intra prediction, whether samples in a row and/or column that are one row or one column distant from the current block (e.g., one example of non-adjacent row or column), or whether samples in a row and/or column that are two rows or two columns distant from the current block (e.g., another example of non-adjacent row or column).

This disclosure describes example techniques to determine which samples in the non-adjacent row and/or column should be utilized for generating the prediction block. The samples in the non-adjacent row and/or column may be aligned with the current block. For example, a last sample of the samples in the non-adjacent row (e.g., furthest right sample) that can be utilized for DC intra prediction may be aligned with the last column (e.g., furthest right column) of the current block. A last sample of the samples in the non-adjacent column (e.g., bottommost sample) that can be utilized for DC intra prediction may be aligned with the last row (e.g., bottommost row) of the current block. In some examples, a first sample of the samples in the non-adjacent row (e.g., furthest left sample) that can be utilized for DC intra prediction may be aligned with the first column (e.g., furthest left column) of the current block, and a first sample of the samples in the non-adjacent column (e.g., topmost sample) that can be utilized for DC intra prediction may be aligned with the first row (e.g., topmost row) of the current block.

In one or more examples, utilizing samples from non-adjacent rows or columns that are aligned with the current block may result in a better prediction block (e.g., in terms of having smaller residual values in the residual block) as compared to utilizing samples from non-adjacent rows or columns that are not aligned with the current block. Also, in some examples, the circuitry of the video coder used for DC intra prediction may not need to access samples located top and left of the current block, which reduces the amount of data that is read. In this manner, the example techniques may improve the overall operation of the video coder and improve the video coding process. For instance, the example techniques provide for a practical application to improve the operations of a video encoder and a video decoder when performing DC intra prediction of a current block.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122 video decoder 300, memory 120, and display device 118. In accordance with this disclosure, video encoder 200 of source device 102 and video decoder 300 of destination device 116 may be configured to apply the techniques for determining which samples to use for DC intra mode prediction, such as where the samples are in non-adjacent rows or columns and are aligned with the current block being coded (e.g., encoded or decoded). Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for determining which samples to use for DC intra mode prediction, such as where the samples are in non-adjacent rows or columns and are aligned with the current block being coded (e.g., encoded or decoded). Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

The following describes some example video coding standards. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

The state-of-the-art video coding standard, namely High-Efficiency Video Coding (HEVC), was finalized by the Joint Collaboration Team on Video Coding (JCT-VC) of ITU-T Video Coding Experts Group (VCEG) and ISO/IEC Motion Picture Experts Group (MPEG) in April 2013. The Joint Video Experts Team (WET), a collaborative team formed by MPEG and ITU-T Study Group 16's VCEG is working on a new video coding standard to be known as Versatile Video Coding (VVC). The primary objective of VVC is to provide a significant improvement in compression performance over the existing HEVC standard, aiding in deployment of higher-quality video services and emerging applications such as 360° omnidirectional immersive multimedia and high-dynamic-range (HDR) video. The development of the VVC standard is expected to be completed in 2020. A recent draft of the VVC standard is described in Bross, et al. "Versatile Video Coding (Draft 5)," Joint Video Experts Team (JVET) of ITU-T SG 16 WP 3 and ISO/IEC JTC 1/SC 29/WG 11, 14$^{th}$ Meeting: Geneva, CH, 19-27 Mar. 2019, JVET-N1001-v8 (hereinafter "VVC Draft 5") and available at http://phenix.it-sudparis.eu/jvet/doc_end_user/documents/13_Marrakech/wg11/WET-N1001-v8.zip.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A more recent draft of the VVC standard is described in Bross, et al. "Versatile Video Coding (Draft 9)," Joint Video Experts Team (JVET) of ITU-T SG 16 WP 3 and ISO/IEC JTC 1/SC 29/WG 11, 18$^{th}$ Meeting: by teleconference, 15-24 Apr. 2020, JVET-R2001-v8 (hereinafter "VVC Draft 9"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

VVC may also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. VVC may provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

As described in more detail below, the example techniques described in this disclosure are related to intra-prediction, such as DC intra mode prediction. In one or more examples, a video coder (e.g., video encoder 200 or video decoder 300) may be configured to determine samples to use for DC intra mode prediction for a current block. For example, to determine the samples, the video coder may be configured to determine a plurality of samples in a non-adjacent row or a non-adjacent column having a last sample in the non-adjacent row that is in same column as last column of the current block or having a last sample in the non-adjacent column that is in same row as last row of the current block. In some examples, the plurality of samples in the non-adjacent row or a non-adjacent column may have a first sample in the non-adjacent row that is in same column as a first column of the current block or have a first sample in the non-adjacent column that is in same row as a first row of the current block. In this manner, the samples used for DC intra mode prediction are aligned with the current block even if the samples are in non-adjacent row or column. The video coder may code (e.g., encode or decode) the current block using DC intra mode prediction using the determined samples.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
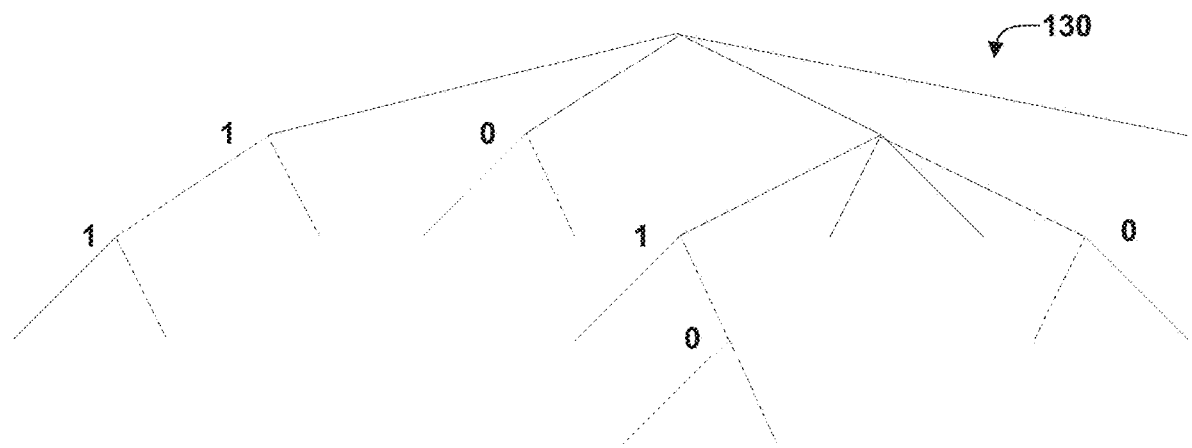
FIGS. 2A and 2B are conceptual diagrams illustrating an example quadtree binary tree (QTBT) structure, and a corresponding coding tree unit (CTU).
Figure 2B:
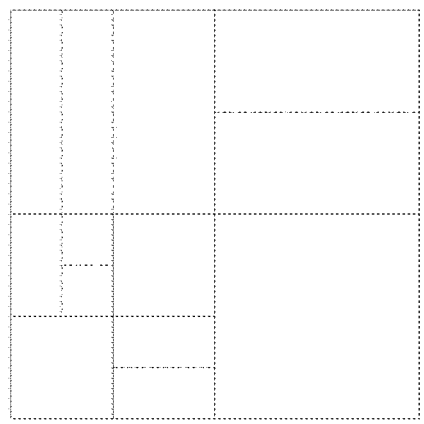

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
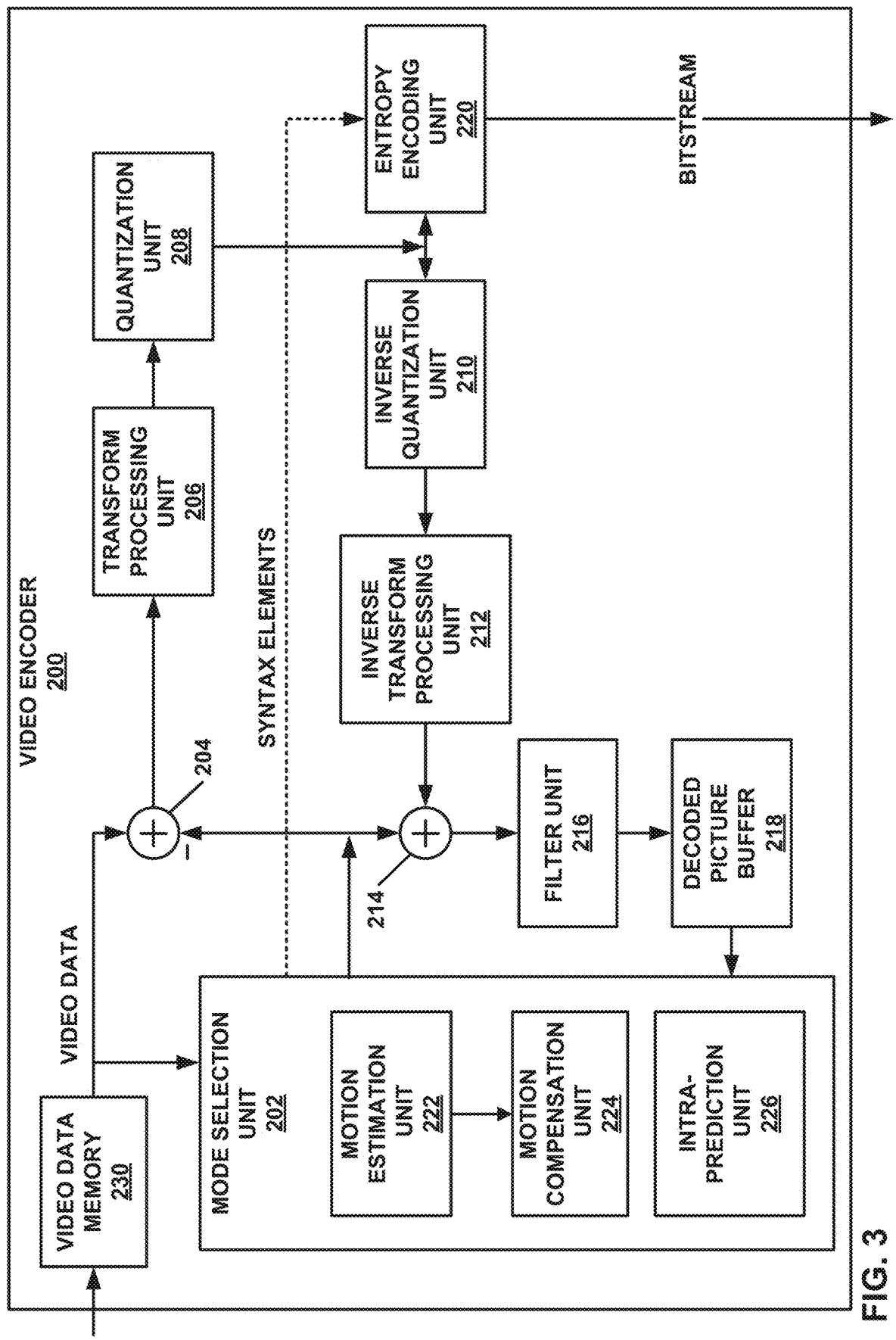
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1).

DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC intra mode prediction, intra-prediction unit 226 may calculate an average of the neighboring samples to the current block and generate the prediction block to include this resulting average for each sample of the prediction block.

In one or more examples described in this disclosure, intra-prediction unit 226, alone or in combination with one or more other components, may be configured to perform one or more of the example techniques described in this disclosure. As one example, mode selection unit 202 may be configured to determine that a current block of the video data is to be predicted utilizing DC intra mode prediction. In some examples of DC intra mode prediction, the samples used to generate the prediction block are samples in an immediately adjacent row (e.g., row immediately above current block) or column (e.g., column immediately left of the current block).

However, in some examples of DC intra mode prediction, the samples may be from non-adjacent rows and/or non-adjacent columns. A non-adjacent row refers to a row that may be above the current block in the same picture but is not the row immediately above the current block. A non-adjacent column refers to a column that may be left of the current block in the same picture but is not the column immediately left of the current block. Examples of non-adjacent rows and columns are described below with respect to examples illustrated in FIGS. 11-19.

As part of the DC intra mode prediction, mode selection unit 202 may generate information indicating which of non-adjacent row and/or non-adjacent column includes the samples that may be used for DC intra mode prediction. For example, video encoder 200 may signal a syntax element indicative of a number of rows or columns the non-adjacent row of samples is above the current block or the non-adjacent column of samples is left of the current block.

In one or more examples, intra-prediction unit 226 may be configured to determine a plurality of samples to use for DC intra mode prediction for the current block. For example, intra-prediction unit 226 may be configured to determine a plurality of sample in at least one of a non-adjacent row of samples having a last sample that is in same column as a last column of the current block. The non-adjacent row of samples is more than one row above the current block. Intra-prediction unit 226 may be configured to determine a non-adjacent column of samples having a last sample that is in same row as a last row of the current block. The non-adjacent column of samples is more than one column left of the current block. For instance, as described in more detail with respect to FIGS. 16-19, a last sample (e.g., furthest right sample) from a plurality of samples in a non-adjacent row may be in the same column (e.g., have the same x-coordinate) as the last column (e.g., further right column) of the current block, and a last sample (e.g., bottommost sample) from a plurality of samples in a non-adjacent column may be in the same row (e.g., have the same y-coordinate) as the last row (e.g., bottommost row) of the current block.

Figure 16:
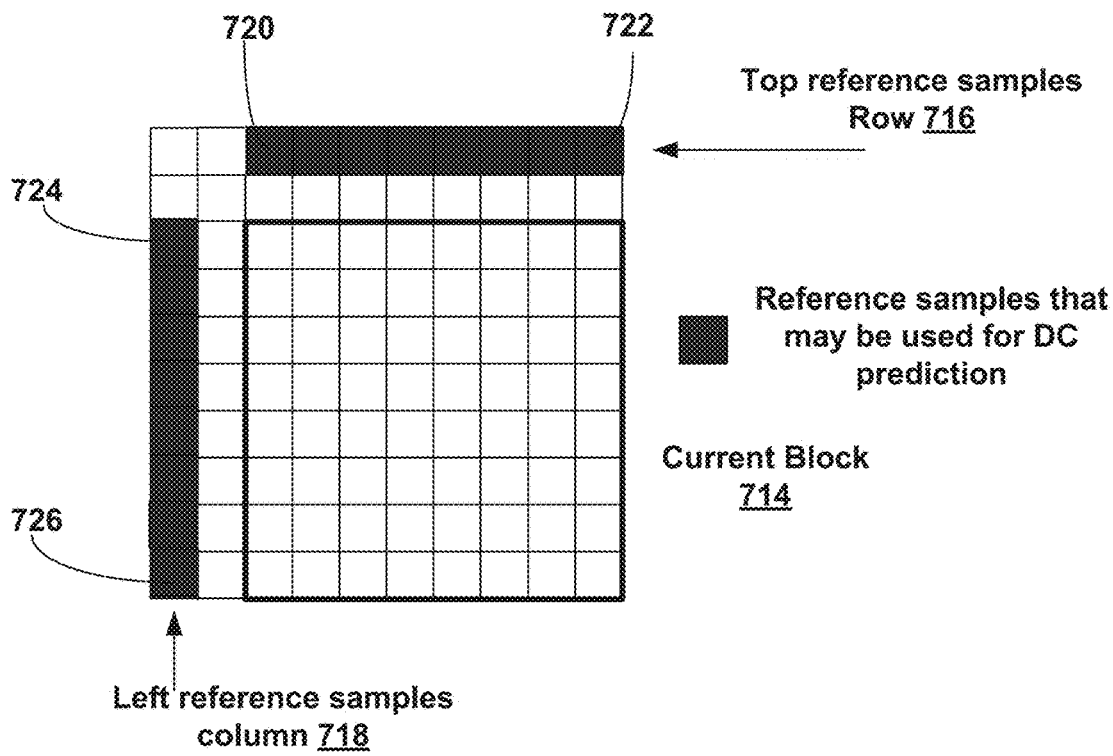
FIGS. 16-19 are conceptual diagrams illustrating reference samples from non-adjacent row and column with alignment with current block.
Figure 17:
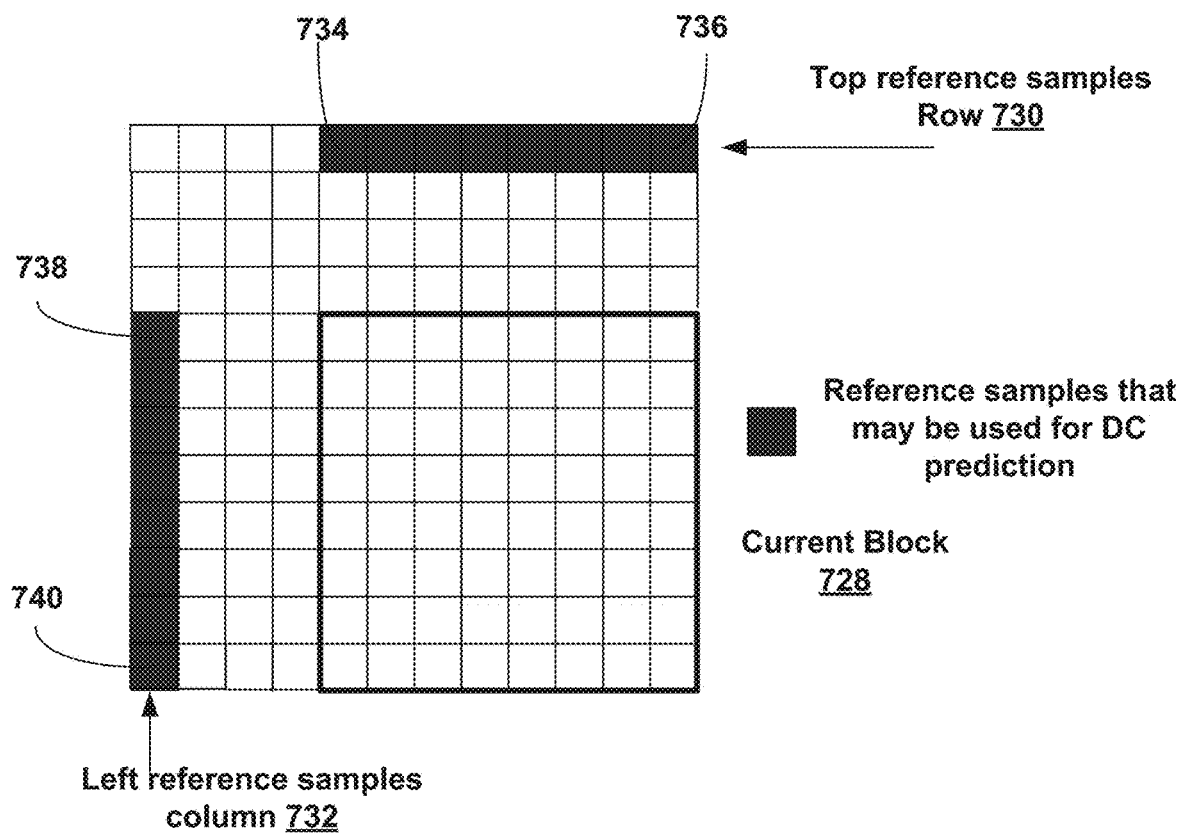
Figure 18:
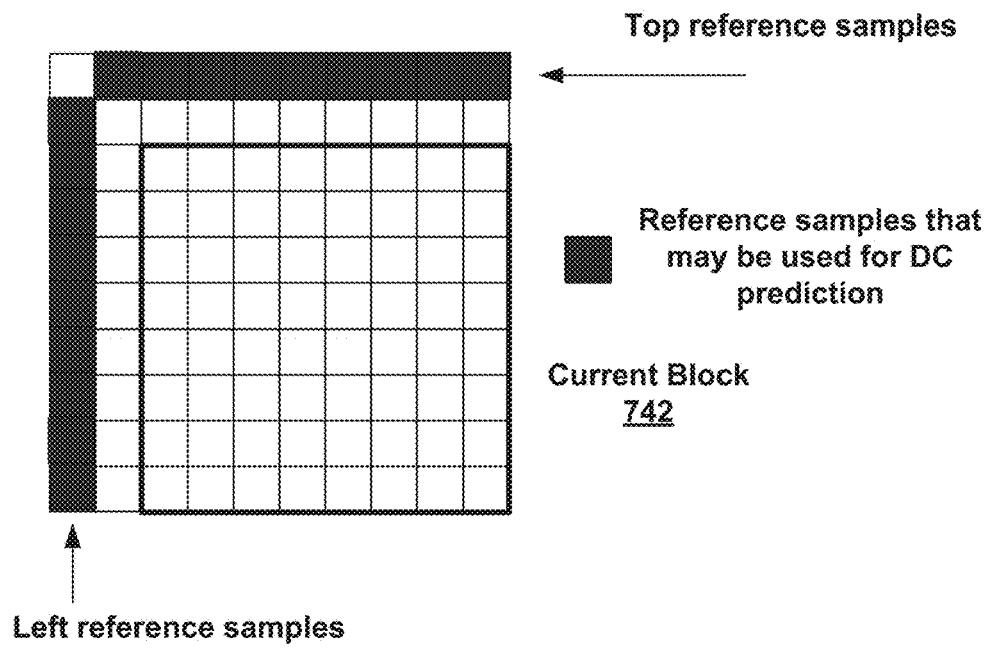

In some examples, as described in more detail with respect to FIGS. 16 and 17, a first sample (e.g., further right sample) from the plurality of samples in the non-adjacent row may be in the same column (e.g., have the same x-coordinate) as the first column (e.g., furthest left column) of the current block. A first sample (e.g., topmost sample) from the plurality of samples in the non-adjacent column may be in the same row (e.g., have the same y-coordinate) as the first row (e.g., topmost row) of the current block.

In this manner, intra-prediction unit 226 may determine samples from non-adjacent row or column to be used for DC intra prediction mode that are aligned with the current block. Some other techniques contemplate using samples from non-adjacent row or column that are not aligned with the current block (e.g., last sample or first sample in the non-adjacent row or column is not in same row or column as last row or column or first row or column of current block). Utilizing such samples from non-adjacent row or column that are not aligned with the current block may result in larger residuals as compared to utilizing samples from non-adjacent row or column that are aligned with the current block and may also require additional memory access.

As described in more detail, residual generation unit 204, along with transform processing unit 206, quantization unit 208, and entropy encoding unit 220 may intra-prediction encode the current block based on the determined samples from the non-adjacent row or column. For example, intra-prediction unit 226 may generate a prediction block utilizing the samples from the non-adjacent row and/or non-adjacent column. Residual generation unit 204 may determine a residual block between the prediction block and the current block, which may be transformed, quantized, and entropy encoded by transform processing unit 206, quantization unit 208, and entropy encoding unit 220, respectively.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

As described above, video encoder 200 represents an example of a device configured to encode video data including a memory configured to store video data, and one or more processing units implemented in circuitry and configured to determine samples to use for DC intra mode prediction for a current block, wherein determining the samples comprises determining a plurality of samples in a non-adjacent row or a non-adjacent column having a last sample in the non-adjacent row that is in same column as last column of the current block or having a last sample in the non-adjacent column that is in same row as last row of the current block. Video encoder 200 may encode the current block using DC intra mode prediction using the determined samples.

Figure 4:
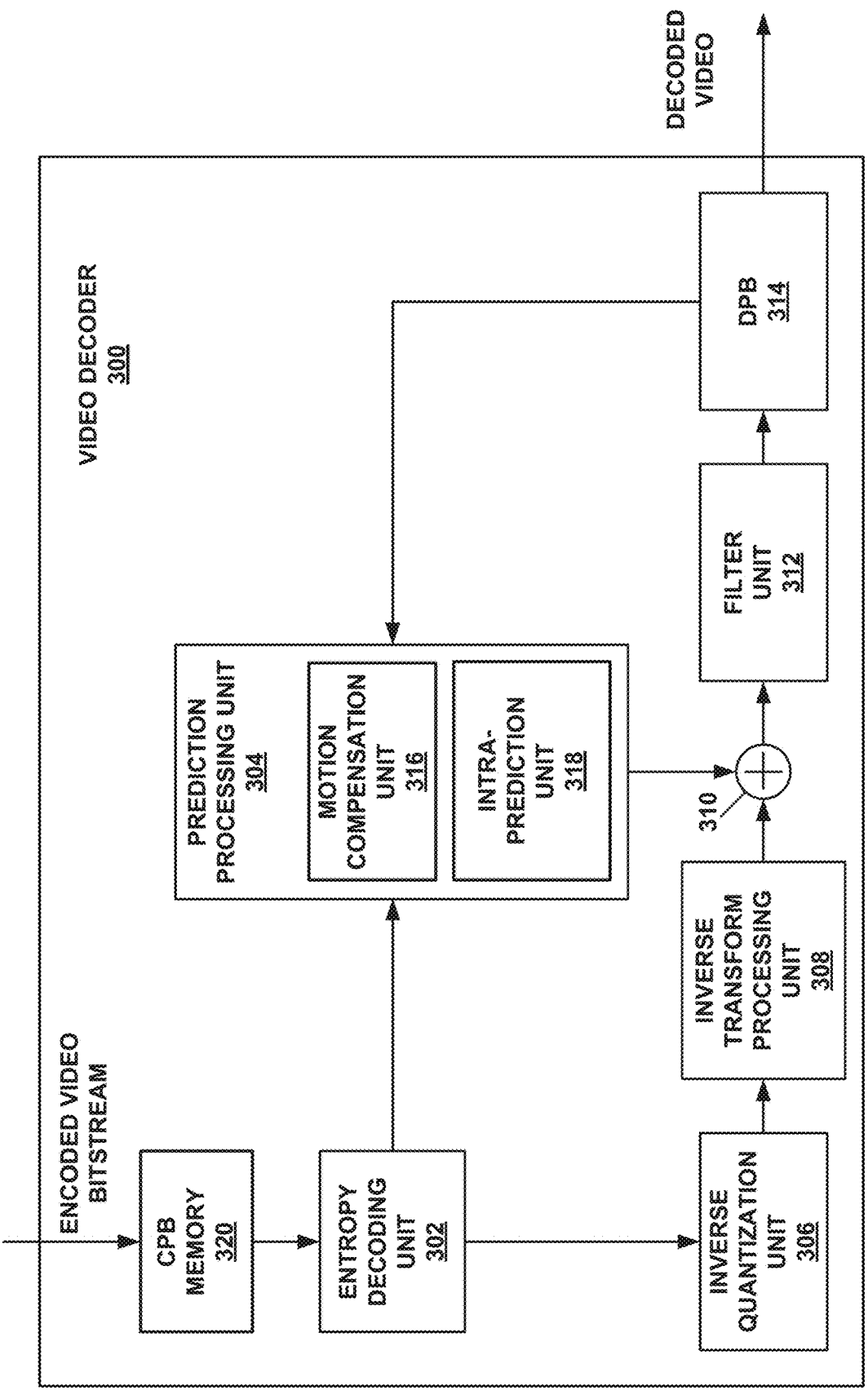
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

In one or more examples described in this disclosure, intra-prediction unit 318, alone or in combination with one or more other components, may be configured to perform one or more of the example techniques described in this disclosure. As one example, prediction processing unit 304 may be configured to determine that a current block of the video data is to predicted utilizing DC intra mode prediction (e.g., based on receiving information signaled by video encoder 200 indicating the prediction mode for the current block). In some examples of DC intra mode prediction, the samples used to generate the prediction block are samples in an immediately adjacent row (e.g., row immediately above current block) or column (e.g., column immediately left of the current block).

However, in some examples of DC intra mode prediction, the samples may be from non-adjacent rows and/or non-adjacent columns. A non-adjacent row refers to a row that may be above the current block in the same picture but is not the row immediately above the current block. A non-adjacent column refers to a column that may be left of the current block in the same picture but is not the column immediately left of the current block. Examples of non-adjacent rows and columns are described below with respect to examples illustrated in FIGS. 11-19.

As part of the DC intra mode prediction, prediction processing unit 304 may generate information indicating which of non-adjacent row and/or non-adjacent column includes the samples that may be used for DC intra mode prediction. For example, video decoder 300 may receive a syntax element indicative of a number of rows or columns the non-adjacent row of samples is above the current block or the non-adjacent column of samples is left of the current block. Prediction processing unit 304 may utilize the syntax element to determine which non-adjacent row and/or non-adjacent column includes samples that are used for DC intra mode prediction of the current block.

In one or more examples, intra-prediction unit 318 may be configured to determine a plurality of samples to use for DC intra mode prediction for the current block. For example, intra-prediction unit 318 may be configured to determine a plurality of sample in at least one of a non-adjacent row of samples having a last sample that is in same column as a last column of the current block. The non-adjacent row of samples is more than one row above the current block. Intra-prediction unit 318 may be configured to determine a non-adjacent column of samples having a last sample that is in same row as a last row of the current block. The non-adjacent column of samples is more than one column left of the current block. For instance, as described in more detail with respect to FIGS. 16-19, a last sample (e.g., furthest right sample) from a plurality of samples in a non-adjacent row may be in the same column (e.g., have the same x-coordinate) as the last column (e.g., further right column) of the current block, and a last sample (e.g., bottommost sample) from a plurality of samples in a non-adjacent column may be in the same row (e.g., have the same y-coordinate) as the last row (e.g., bottommost row) of the current block.

In some examples, as described in more detail with respect to FIGS. 16 and 17, a first sample (e.g., further right sample) from the plurality of samples in the non-adjacent row may be in the same column (e.g., have the same x-coordinate) as the first column (e.g., furthest left column) of the current block. A first sample (e.g., topmost sample) from the plurality of samples in the non-adjacent column may be in the same row (e.g., have the same y-coordinate) as the first row (e.g., topmost row) of the current block.

In this manner, intra-prediction unit 318 may determine samples from non-adjacent row or column to be used for DC intra prediction mode that are aligned with the current block. Some other techniques contemplate using samples from non-adjacent row or column that are not aligned with the current block (e.g., last sample or first sample in the non-adjacent row or column is not in same row or column as last row or column or first row or column of current block). Utilizing such samples from non-adjacent row or column that are not aligned with the current block may result in larger residuals as compared to utilizing samples from non-adjacent row or column that are aligned with the current block and may also require reading additional samples.

As described in more detail, video decoder 300 may be configured to decode the current block using DC intra prediction mode using the determined samples from the non-adjacent row or column. For example, intra-prediction unit 318 may generate a prediction block utilizing the samples from the non-adjacent row and/or non-adjacent column. As described above, entropy decoding unit 302, inverse quantization unit 306, and inverse transform processing unit 308 may have determined a residual block.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

In this manner, video decoder 300 represents an example of a video decoding device including a memory configured to store video data, and one or more processing units implemented in circuitry and configured to determine samples to use for DC intra mode prediction for a current block, wherein determining the samples comprises determining a plurality of samples in a non-adjacent row or a non-adjacent column having a last sample in the non-adjacent row that is in same column as last column of the current block or having a last sample in the non-adjacent column that is in same row as last row of the current block. Video decoder 300 may be configured to decode the current block using DC intra mode prediction using the determined samples.

Figure 5:
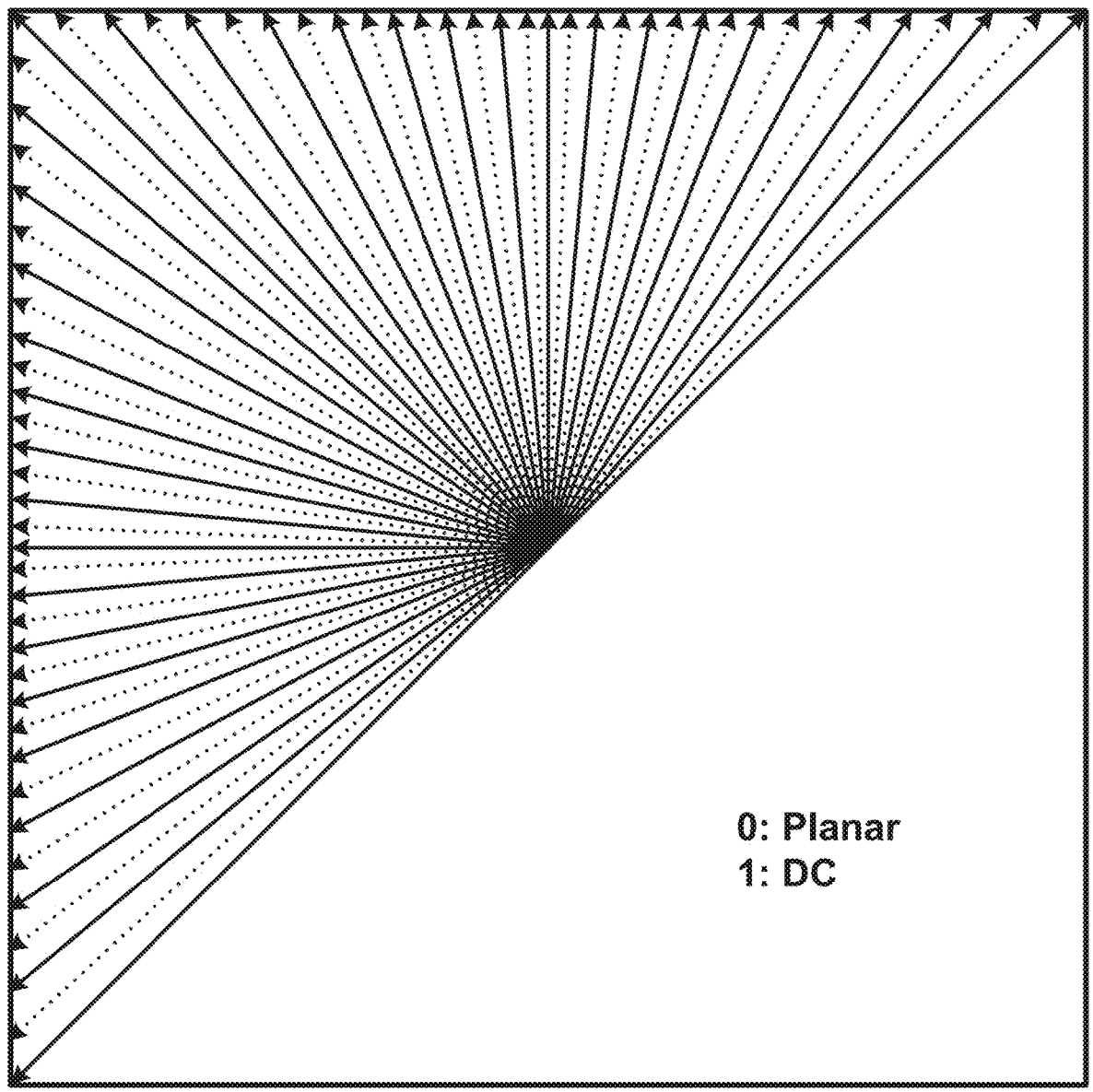
FIG. 5 is a conceptual diagram illustrating directions of intra prediction with arrows pointing towards the reference samples.

As described above, the example techniques described in this disclosure may be related to intra prediction mode. The following describes intra prediction angles and wide-angle intra prediction. Intra prediction involves DC prediction mode, Planar prediction mode and directional (or angular) prediction mode. Directional prediction for square blocks uses directions between −135 degrees to 45 degrees of the current block in the VVC test model 2 (VTM2) J. Chen, Y. Ye, S. Kim, "Algorithm description for Versatile Video Coding and Test Model 2 (VTM2)," 11$^{th}$ JVET Meeting, Ljubljana, SI, July 2018, JVET-K1002, as illustrated in FIG. 5.

In VTM2, the block structure used for specifying the prediction block for intra prediction is not restricted to be square (width w=height h). Rectangular or non-square prediction blocks (w>h or w<h) can increase the coding efficiency based on the characteristics of the content.

Figure 6:
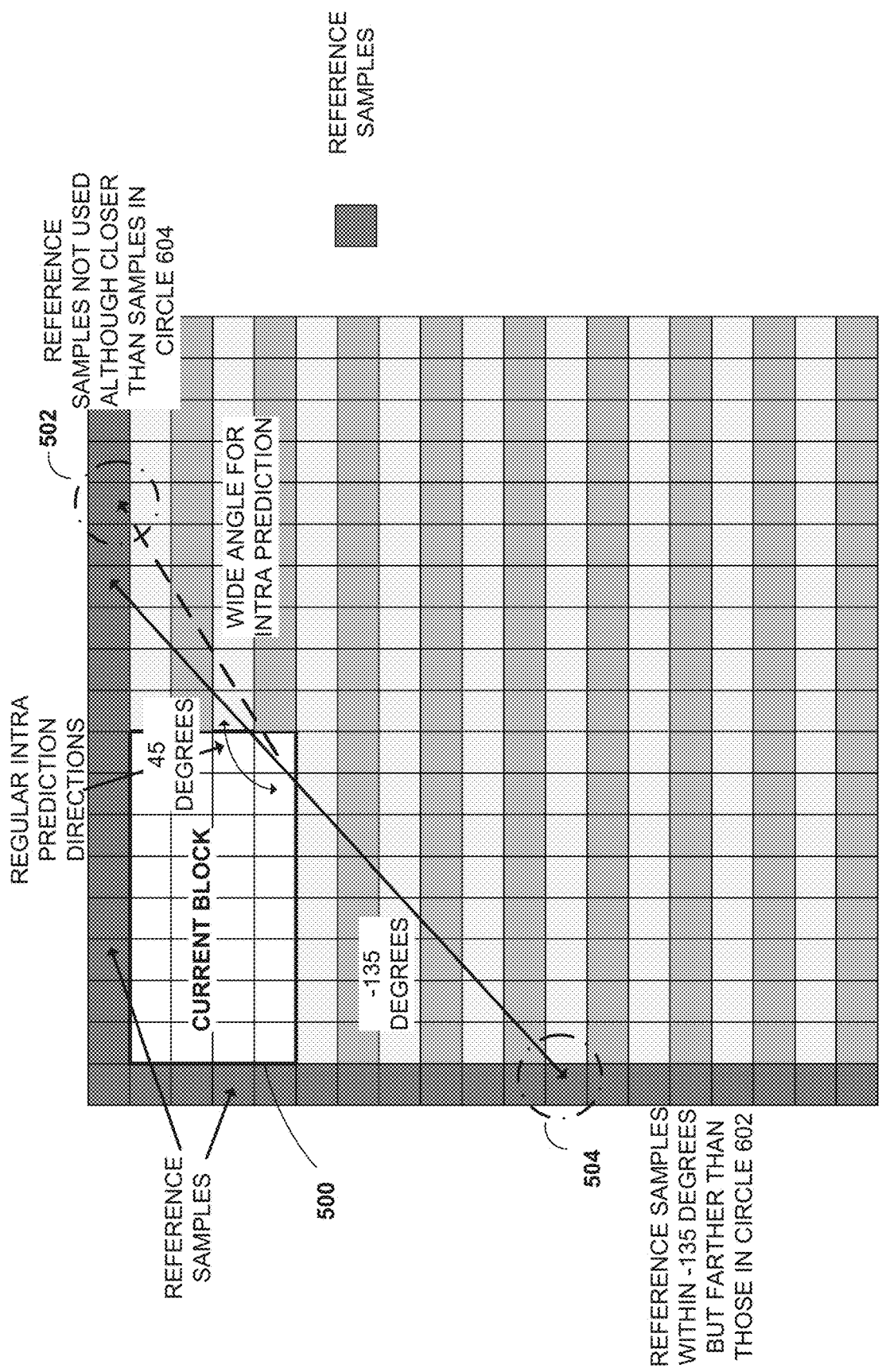
FIG. 6 is a conceptual diagram illustrating an example of an 8×4 rectangular block that is intra-predicted.

In such rectangular blocks, restricting the direction of intra prediction to be within −135 degrees to 45 degrees can result in situations where farther reference samples are used rather than closer reference samples for intra prediction. Such a design is likely to have an impact on the coding efficiency. It may be more beneficial to have the range of restrictions relaxed so that closer reference samples (beyond the −135 to 45-degree angle) can be used for prediction. An example of such a case is given in FIG. 6. For example, FIG. 6 illustrates an example of 8×4 rectangular block, identified as current block 500, where closer reference samples are not used (e.g., such as reference sample 502), but farther reference samples may be used (e.g., such as reference sample 504), due to restriction of intra prediction direction to be in the range −135 degrees to 45 degrees.

Figure 8:
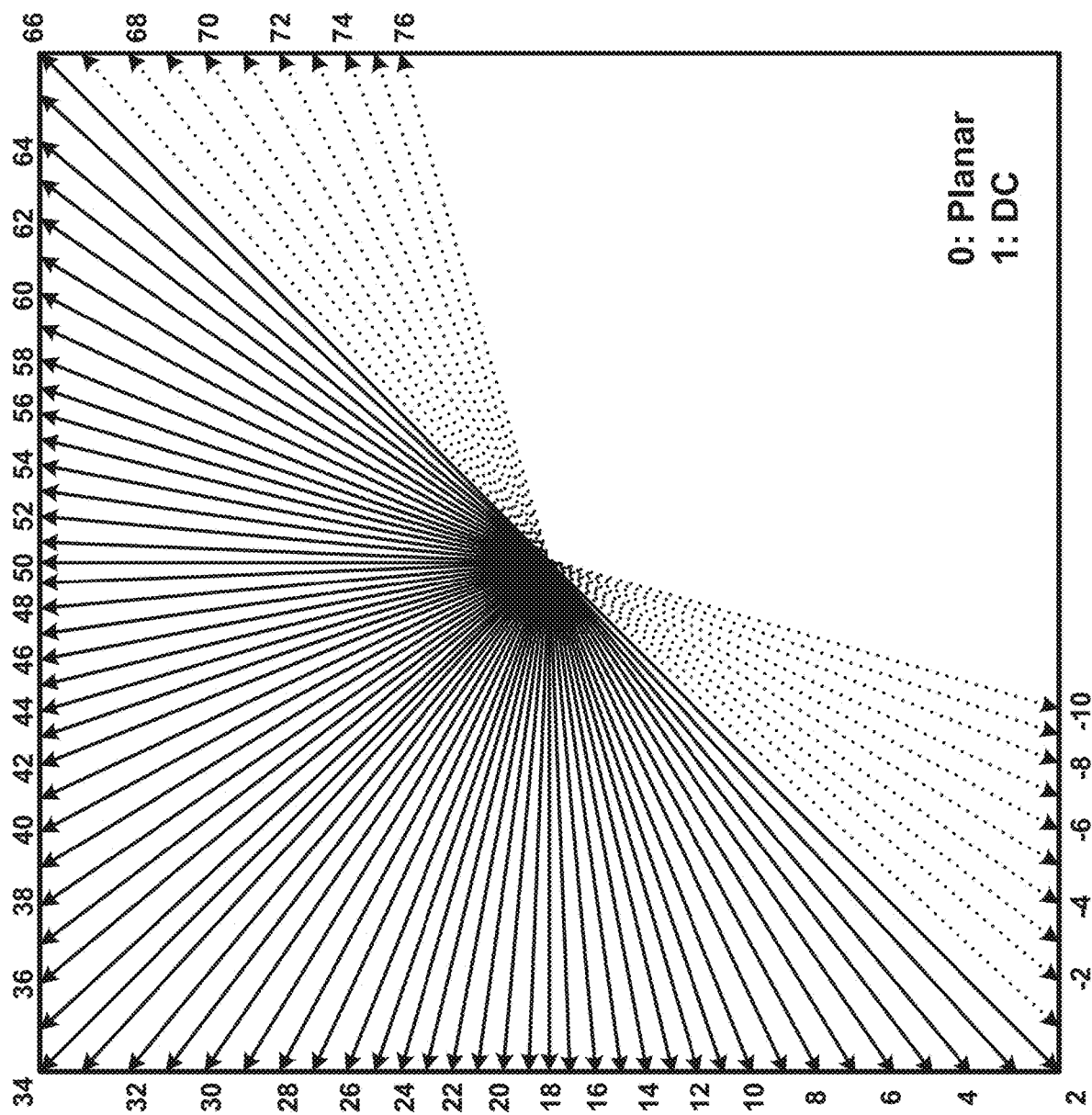
FIG. 8 is a conceptual diagram illustrating wide angles (−1 to −10 and 67 to 76) in addition to 65 angular modes.

VTM2 also utilized wide angles. One example of the wide angles that are adopted in VTM2 are illustrated in FIG. 8.

During the 12$^{th}$ JVET meeting, a modification of wide-angle intra prediction was adopted into VVC Test Model 3.0 (VTM3), as described in the following documents: L. Zhao, X. Zhao, S. Liu, X. Li, "CE3-related: Unification of angular intra prediction for square and non-square blocks," 12$^{th}$ JVET Meeting, Macau SAR, CN, October 2018, JVET-L0279, J. Chen, Y. Ye, S. Kim, "Algorithm description for Versatile Video Coding and Test Model 3 (VTM3)," 12$^{th}$ JVET Meeting, Macau SAR, CN, October 2018, JVET-L1002, and B. Bross, J. Chen, S. Liu, "Versatile Video Coding (Draft 3)," 12$^{th}$ JVET Meeting, Macau SAR, CN, October 2018, JVET-L1001.

Figure 7A:
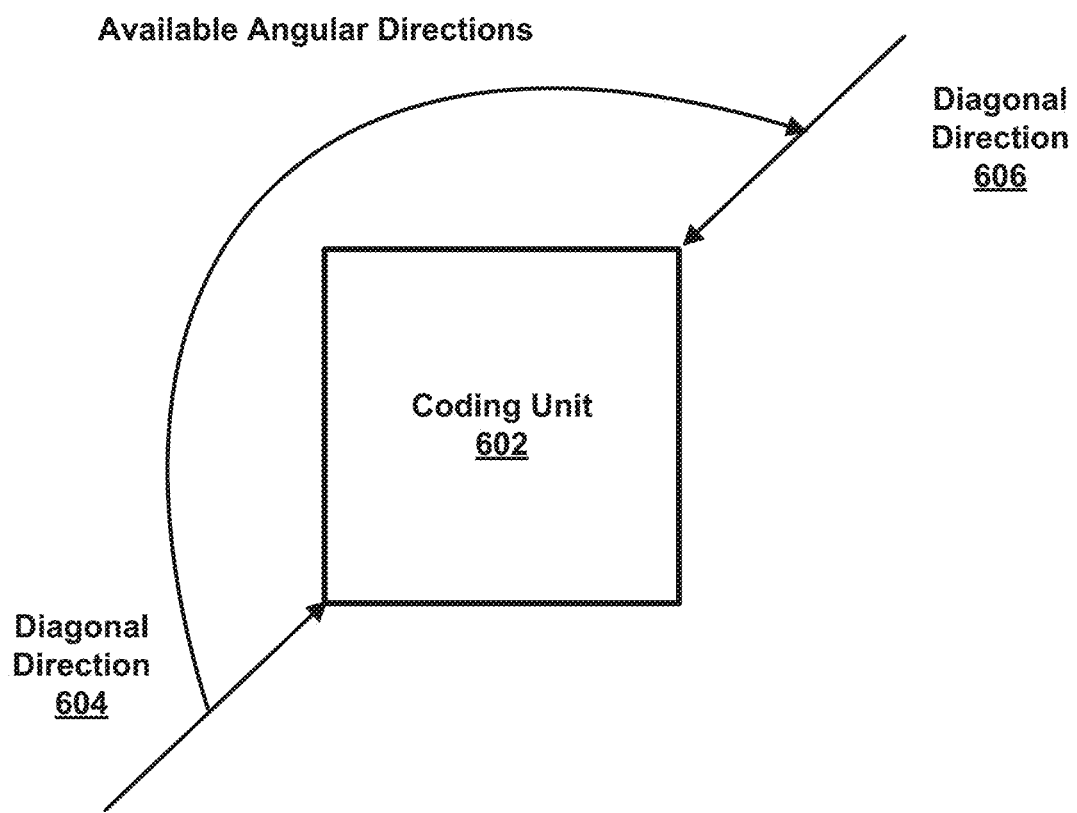
FIGS. 7A-7C are conceptual diagrams illustrating mode mapping process for modes outside the diagonal direction range.
Figure 7B:
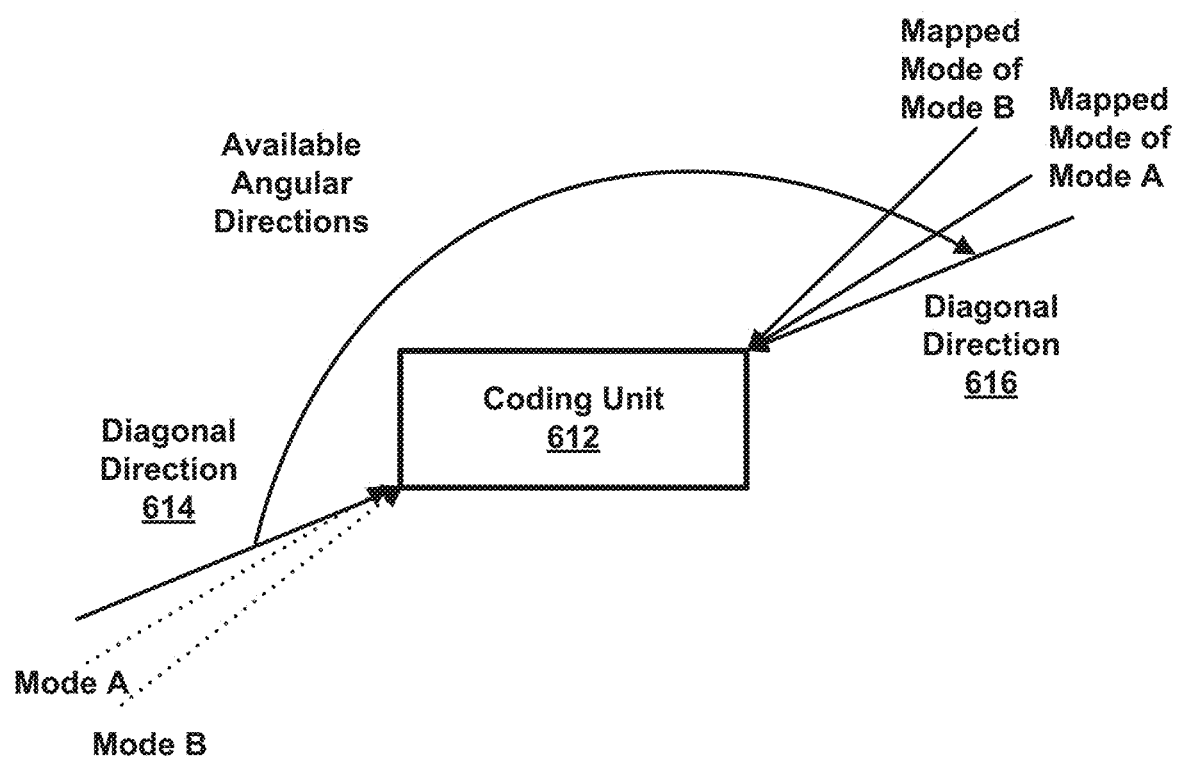
Figure 7C:
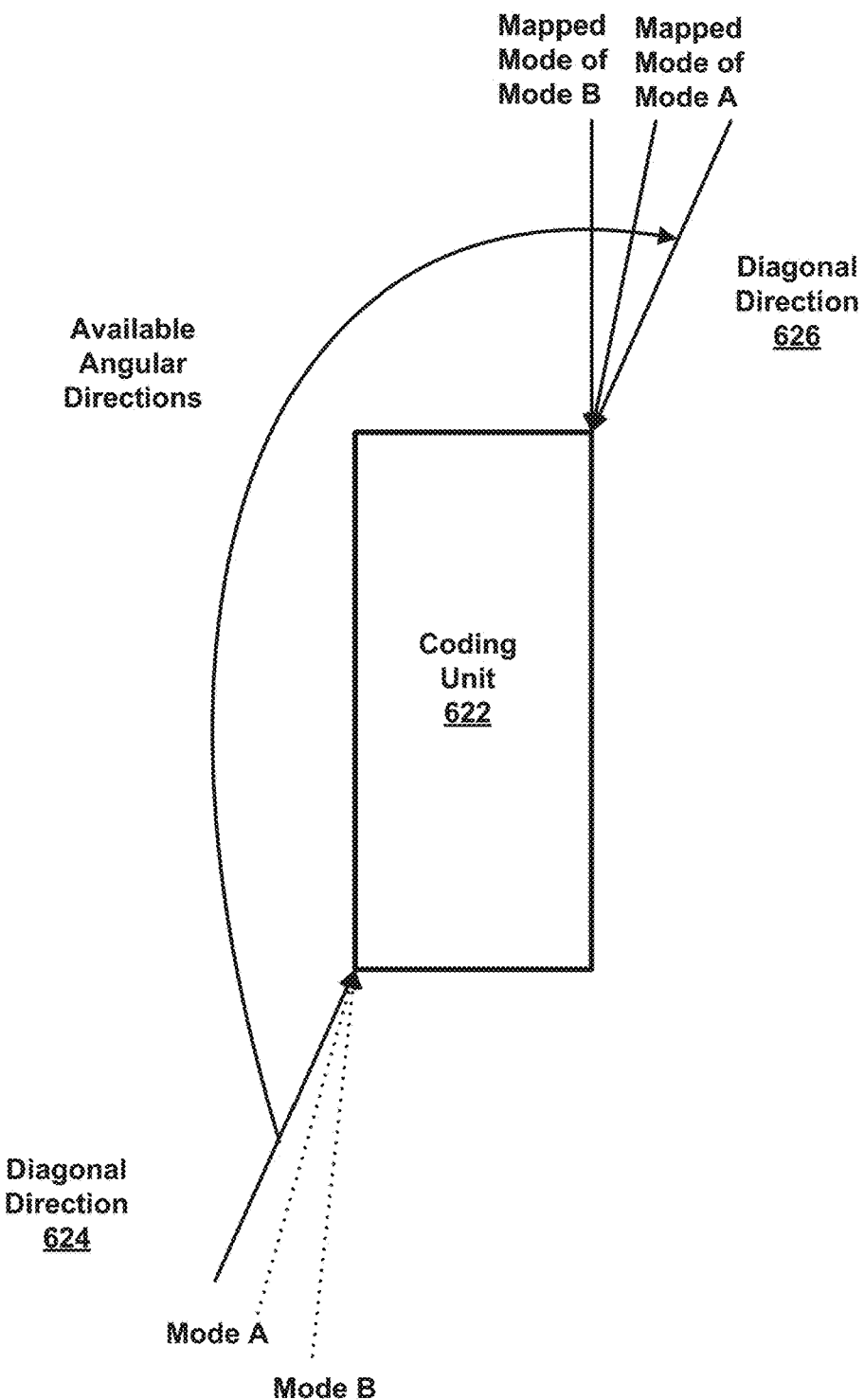

This adoption of wide-angle intra prediction includes two modifications to unify the angular intra prediction for square and non-square blocks. Firstly, angular prediction directions are modified to cover diagonal directions of all block shapes. Secondly, all angular directions are kept within the range between the bottom-left diagonal direction and the top-right diagonal direction for all block aspect ratios (square and non-square) as illustrated in FIGS. 7A-7C. FIG. 7A illustrates that square block (e.g., coding unit 602) does not require angular mode remapping (e.g., angular directions between diagonal direction 604 and diagonal direction 606 are available). FIG. 7B illustrates angular mode remapping for horizontal non-square block (e.g., coding unit 612). For instance, there may be mode mapping of mode A and Mode B that are outside of diagonal direction 614 to be within diagonal direction 614 and diagonal direction 616. FIG. 7C illustrates angular remapping for vertical non-square block (e.g., coding unit 622). For instance, there may be mode mapping of mode A and Mode B that are outside of diagonal direction 624 to be within diagonal direction 624 and diagonal direction 626.

Figure 9:
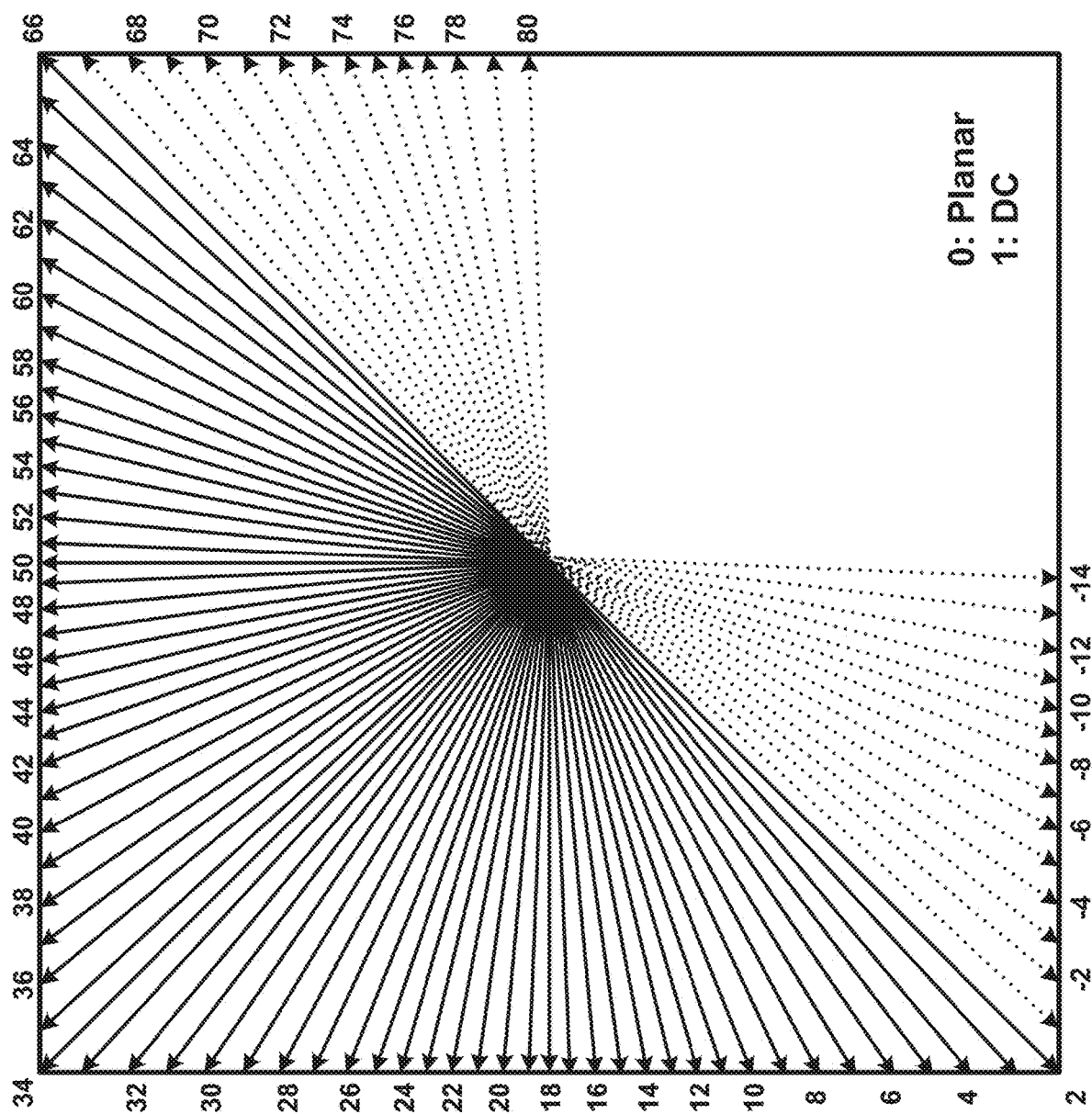
FIG. 9 is a conceptual diagram illustrating wide angles (−1 to −14 and 67 to 80) beyond modes 2 and 6 for a total of 93 angular mode.

In addition, the number of reference samples in the top reference row and left reference column are restricted to 2 width+1 and 2*height+1 for all block shapes. An illustration of wider angles that are adopted in VTM3 is provided in FIG. 9 (e.g., relative to FIG. 8). Although VTM3 defines 95 modes, for any block size, only 67 modes may be allowed. The exact modes that are allowed depend on the ratio of block width to height. Allowance of exact modes is done by restricting the mode range for certain blocks sizes.

FIG. 10 specifies the mapping table between predModeIntra and the intra prediction angle parameter intraPredAngle in VTM3, as described in JVET-L1001. The angular modes corresponding with non-square block diagonals, vertical and horizontal modes, and square block diagonal modes are utilized. In FIG. 10, angular modes with a positive intraPredAngle value are referred to as positive angular modes (mode index <18 or >50), while angular modes with a negative intraPredAngle value are referred to as negative angular modes (mode index>18 and <50).

The inverse angle parameter invAngle is derived based on intraPredAngle as follows:

$$\text{invAngle} = \text{Round}\left(\frac{256*32}{\text{intraPredAngle}}\right) \quad (2-1)$$

In some examples, intraPredAngle values that are multiples of 32 (0, 32, 64, 128, 256, 512) may always correspond with prediction from non-fractional reference array samples, as is the case in the VTM3 specification.

TABLE 1

| Block aspect ratio (width/height) | Diagonal modes |
|---|---|
| 1 (square) | 2, 34, 66 |
| 2 | 8, 28, 72 |
| 4 | 12, 24, 76 |
| 8 | 14, 22, 78 |
| 16 | 16, 20, 80 |
| 1/2 | −6, 40, 60 |
| 1/4 | −10, 44, 56 |
| 1/8 | −12, 46, 54 |
| 1/16 | −14, 48, 52 |

Figure 11:
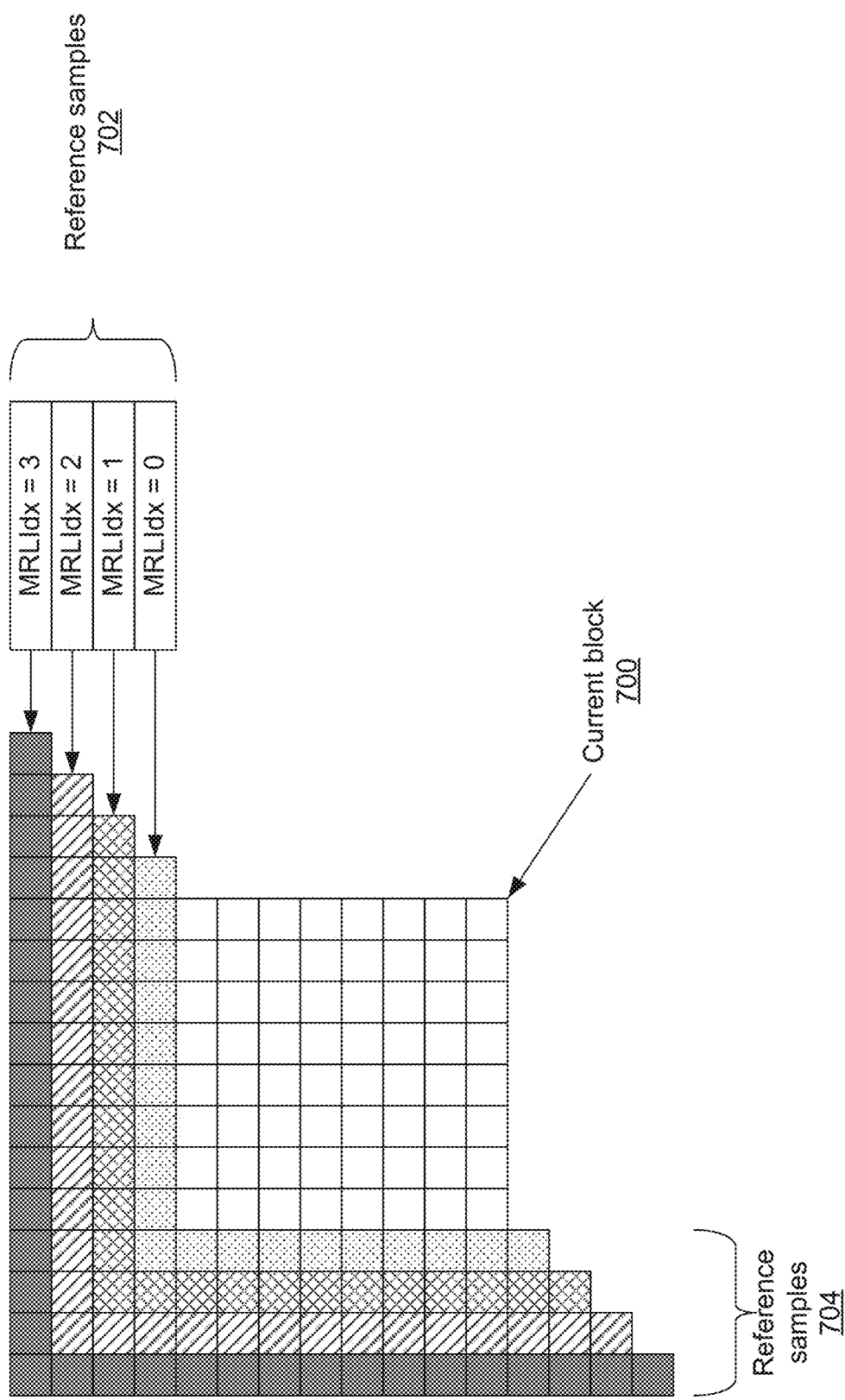
FIG. 11 is a conceptual diagram illustrating reference samples from multiple reference lines that may be used for intra prediction of the coding block.

The following describes multiple reference line prediction. The samples in the neighborhood of a coding block are used for intra prediction of the block. Typically, the reconstructed reference sample lines that are closest to the left and the top boundaries of the coding block are used as the reference samples for intra prediction. However, VVC WD4 also enables other samples in the neighborhood of the coding block to be used as reference samples. FIG. 11 illustrates the reference sample lines that may be used for intra prediction. For each coding block, an index is signalled that indicates the reference line that is used.

In VVC WD4, only reference lines with MRLIdx equal to 0, 1 and 3 can be used. The index to the reference line used for coding the block (values 0, 1 and 2 indicating lines with MRLIdx 0, 1 and 3, respectively) is coded with truncated unary codeword. Planar and DC modes are not used for the reference line used has MRLIdx>0.

For example, in FIG. 11, for current block 700, intra-prediction unit 226 of video encoder 200 and intra-prediction unit 318 of video decoder 300 may determine which row and column includes reference samples that can be used for intra prediction. In FIG. 11, reference samples 702 refer to reference samples from rows above the current block 700, and reference samples 704 refer to reference samples from columns left of the current block 700. Video encoder 200 may signal a syntax element (e.g., MRLIdx) indicative of a number of rows or columns the non-adjacent row of samples is above the current block or the non-adjacent column of samples is left of the current block. Similarly, video decoder 300 may receive a syntax element (e.g., MRLIdx) indicative of a number of rows or columns the non-adjacent row of samples is above the current block or the non-adjacent column of samples is left of the current block. For example, if MRLIdx equals 0, then samples in the row and column immediately above and left of current block 700 may be utilized. If MRLIdx equals 1, then samples in the non-adjacent row or non-adjacent column that are two rows above or two columns left of current block 700 may be utilized. If MRLIdx equals 3, then samples in the non-adjacent row or non-adjacent column that are four rows above or four columns left of the current block 700 may be utilized.

The following describes DC intra prediction mode. DC intra prediction mode is one of the prediction modes, where the prediction block is filled with a "DC value" that is derived from the neighboring reference samples. In VVC, the reference samples that are near the top and left boundaries of the block are used for deriving the DC value. The exact derivation depends on the aspect ratio of the block, and the derivation is as follows (reproduced from Section 8.4.5.2.11 of JVET WD5):

Inputs to this process are:
a variable nTbW specifying the transform block width,
a variable nTbH specifying the transform block height,
a variable refIdx specifying the intra prediction reference line index,
the neighbouring samples p[x][y], with x=−1−refIdx, y=−1−refIdx . . . nTbH−refIdx−1 and x=−refIdx . . . nTbW−1−refIdx, y=−1−refIdx.

Outputs of this process are the predicted samples predSamples[x][y], with x=0 . . . nTbW−1, y=0 . . . nTbH−1.

The values of the prediction samples predSamples[x][y], with x=0 . . . nTbW−1, y=0 . . . nTbH−1, are derived by the following ordered steps:

1. A variable dcVal is derived as follows:
   When nTbW is equal to nTbH:

$$dc\text{Val}=(\Sigma_{x'=0}^{nTbW-1}p[x'-\text{refIdx}][-1-\text{refIdx}]+ \Sigma_{y'=0}^{nTbH-1}p[-1-\text{refIdx}][y'-\text{refIdx}]+n\text{TbW})>> (\text{Log }2(n\text{TbW})+1) \quad (8\text{-}114)$$

When nTbW is greater than nTbH:

$$dc\text{Val}=(\Sigma_{x'=0}^{nTbW-1}p[x'-\text{refIdx}][-1-\text{refIdx}]+ (n\text{TbW}>>1))>>\text{Log }2(n\text{TbW}) \quad (8\text{-}115)$$

When nTbW is less than nTbH:

$$dc\text{Val}=(\Sigma_{y'=0}^{nTbH-1}p[-1-\text{refIdx}][y'-\text{refIdx}]+ (n\text{TbH}>>1))>>\text{Log }2(n\text{TbH}) \quad (8\text{-}116)$$

2. The prediction samples predSamples[x][y] are derived as follows:

$$\text{predSamples}[x][y]=dc\text{Val, with }x=0\ldots n\text{TbW}-1, y=0\ldots n\text{TbH}-1 \quad (8\text{-}117)$$

Figure 12:
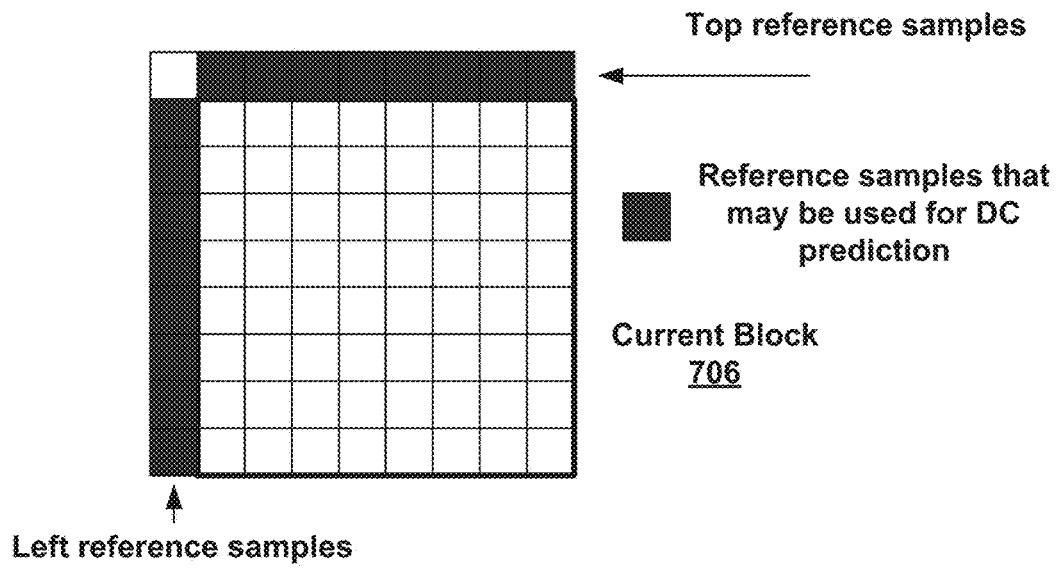
FIG. 12 is a conceptual diagram illustrating reference samples from immediately adjacent row and column.

Some of the techniques used for DC intra mode prediction may have technical problems that negatively impact the coding process. For instance, for cases where the immediately adjacent reference line (e.g., row or column) is used for prediction, i.e., MRLIdx is equal to 0, the DC value may be calculated from the samples that are above and left of the current block. The reference samples that are used are aligned with the top and left boundaries of current block 706 as shown in FIG. 12.

Figure 13:
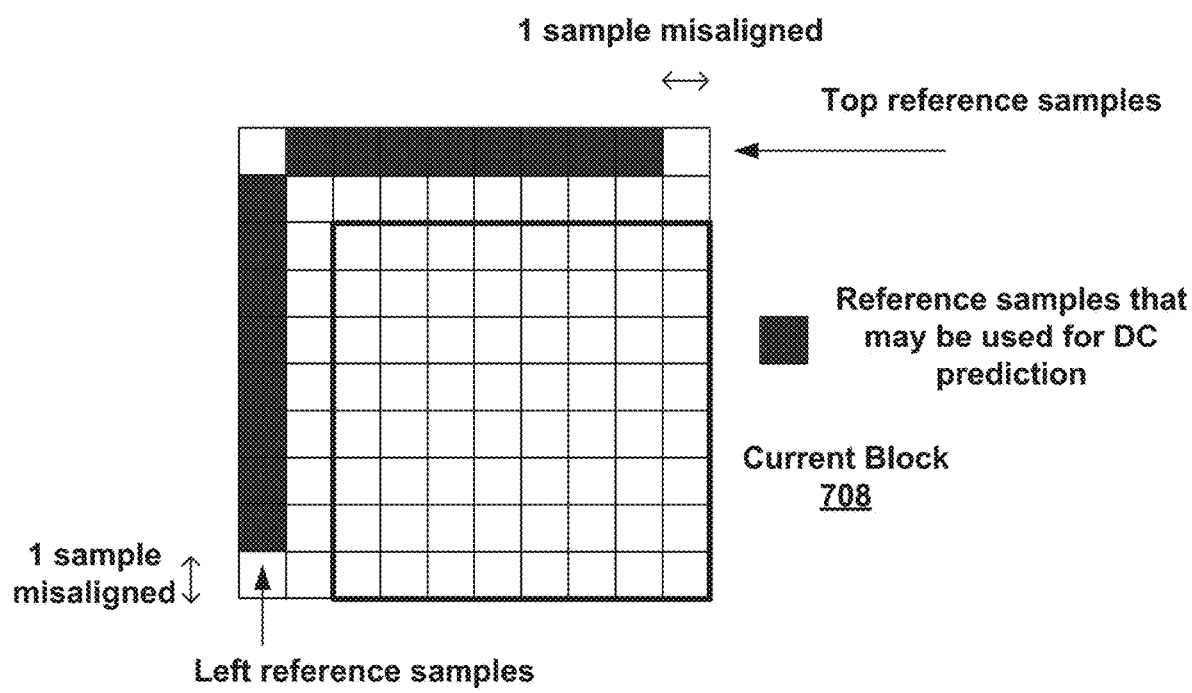
FIGS. 13-15 are conceptual diagrams illustrating reference samples from non-adjacent row and column with misalignment with current block.
Figure 14:
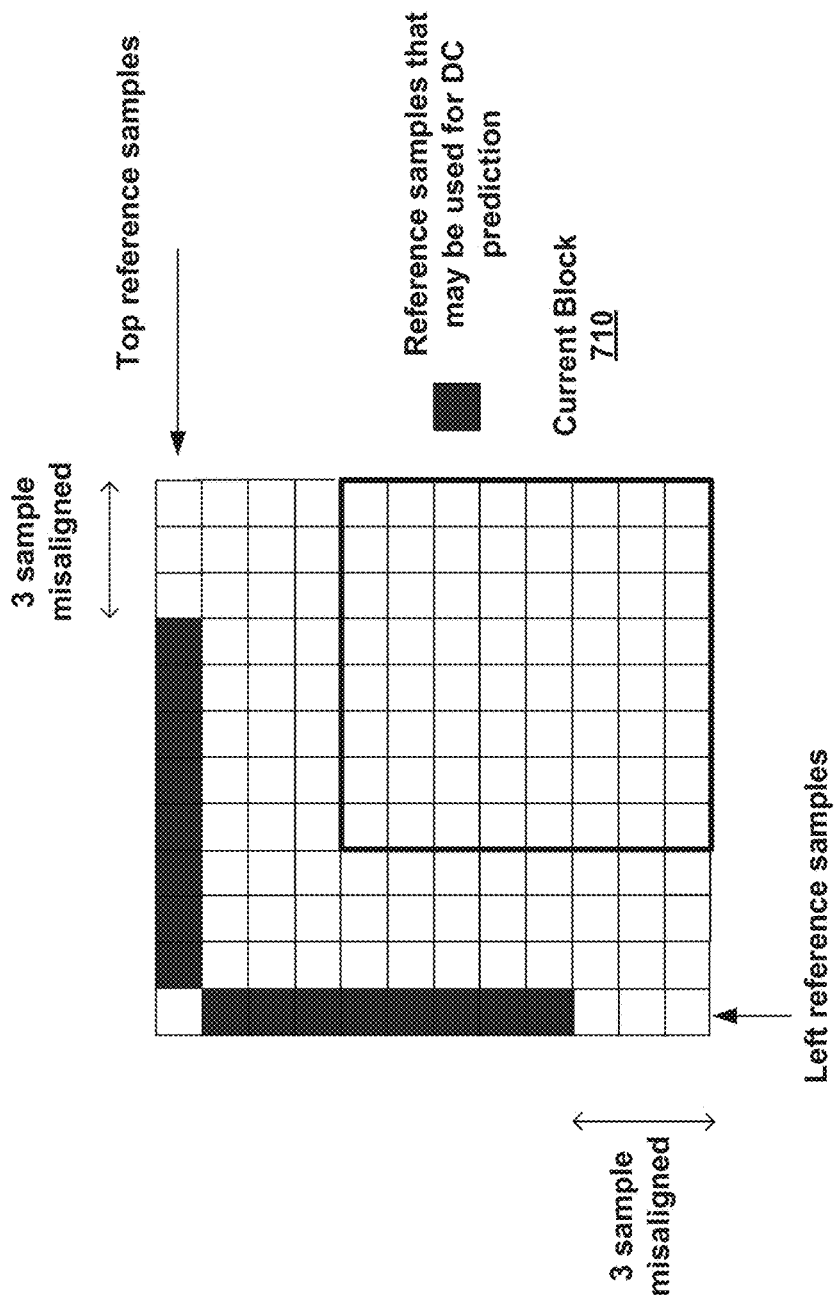

When MRLIdx is greater than 0, the reference samples (from the corresponding line (e.g., row or column)) are no longer aligned with the top and left boundaries of the current block. As shown in FIGS. 13 and 14, when MRLIdx>0 (e.g., indicating reference samples are from non-adjacent row or column), the reference samples are shifted by an offset (hence misaligned) from the boundaries of the block. In FIG. 13, MRLIdx is equal to 1, and as illustrated, the samples that may be used for DC intra prediction for current block 708 are misaligned by 1 sample. In FIG. 14, MRLIdx is equal to 3, and as illustrated, the samples that may be used for DC intra prediction for current block 710 are misaligned by 3 samples.

Figure 15:
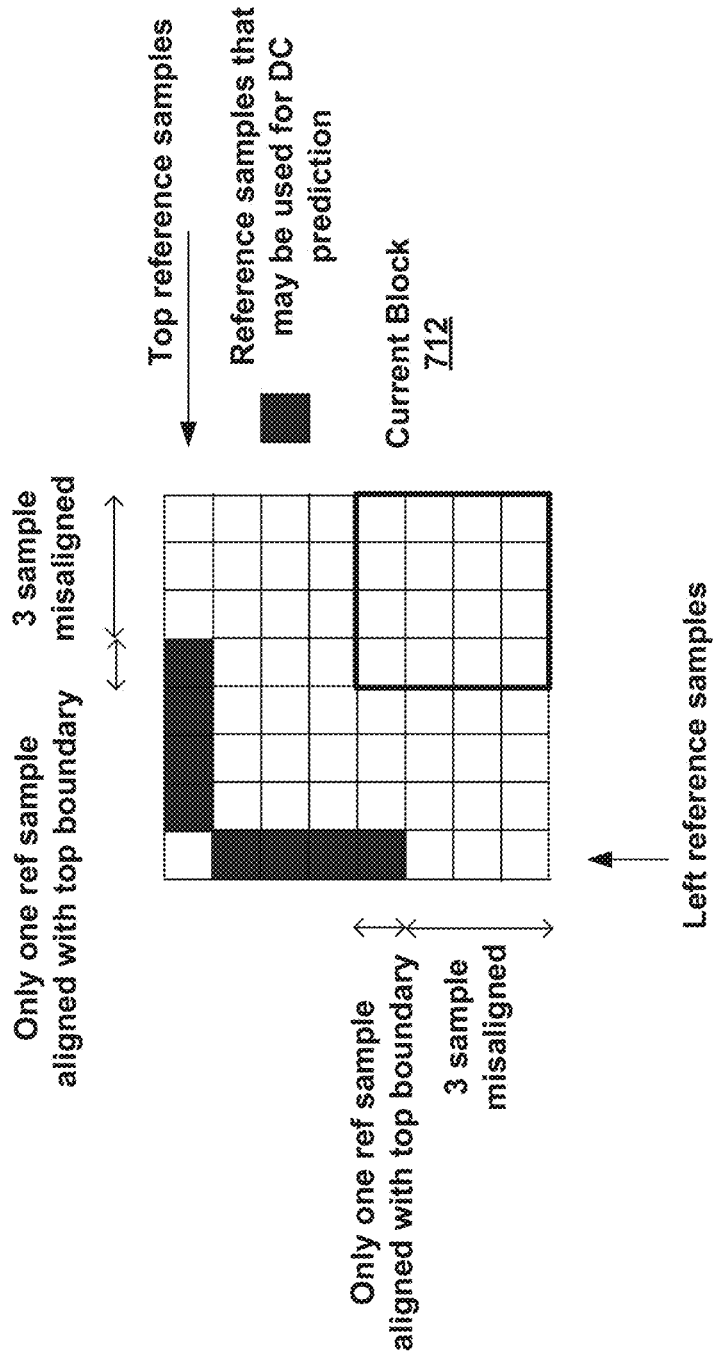

In cases where one or more boundaries is small (e.g., 4×4 block), this misalignment is more severe, with overlap of only one sample for MRLIdx=3, as shown in FIG. 15. For example, FIG. 15 illustrates current block 712. In this case, the misalignment of the samples used for intra predicting current block 712 is 3 samples. Because current block 712 is 4×4, as illustrated in FIG. 15, there is only one sample from the samples in the column to the left of current block that aligns with top row of current block 712, and only one sample from the samples in the row above the current block that aligns with the first column of current block 712.

Such misalignment may result in a less accurate prediction of DC value, and thus an inferior and/or less optimal DC prediction. Although the illustrations here depict square blocks, such misalignment also happens in cases of rectangular blocks, but for one direction in VVC (top or left based on the aspect ratio).

This disclosure describes examples techniques to improve the design of DC intra mode prediction. The example techniques may be implemented separately or together. In general, a video coder may determine samples to use for DC intra mode prediction for a current block. To determine the samples, the video coder may be configured to determine a plurality of samples in a non-adjacent row or a non-adjacent column having a last sample in the non-adjacent row that is in same column as last column of the current block or having a last sample in the non-adjacent column that is in same row as last row of the current block.

For instance, as illustrated in FIGS. 16-19, the darkened blocks illustrate the reference samples from non-adjacent rows or columns (e.g., non-adjacent lines) of samples used for DC intra mode prediction (e.g., intra-predicting in DC mode). For the non-adjacent row, the last sample (e.g., furthest right) in the non-adjacent row may be in the same column as the last column of the current block being coded. For the non-adjacent column, the last sample (e.g., furthest bottom) in the non-adjacent column may be the same rows as the last row of the current block being coded.

In some examples, the first sample (e.g., furthest left) in the non-adjacent row may be in the same column as the first column of the current block being coded. However, in some examples, the first sample in the non-adjacent row may be in a column left of the first column of the current block being coded. In some examples, the first sample (e.g., furthest top) in the non-adjacent row may be in the same row as the first row of the current block being coded. However, in some examples, the first sample in the non-adjacent column may be in a row above the first row of the current block being coded.

For example, a video coder (e.g., video encoder 200 or video decoder 300) may be configured to determine samples to use for DC intra prediction for current block 714 of FIG. 16. To determine the samples, the video coder may be configured to determine a plurality of samples in at least one of a non-adjacent row of samples (e.g., row 716 of FIG. 16) having a last sample 722 that is in same column as a last column of the current block 714 or a non-adjacent column of samples (e.g., column 718) having a last sample 726 that is in same row as a last row of current block 714.

For example, in FIG. 16, sample 722 is the last sample of the plurality of samples in row 716 that is in the same column as a last column of current block 714, and sample 726 is the last sample of the plurality of samples in column 718 that is in the same row as the last row of current block 714. There may be more samples to the right of sample 722 in row 716, and more samples below sample 726 in column 718. However, the samples used for DC intra prediction of current block 714 may not extend right of sample 722 in row 716 or below sample 726 in column 718. In FIG. 16, the non-adjacent row of samples (e.g., samples in row 716) is more than one row above current block 714, and the non-adjacent column of samples (e.g., samples in column 718) is more than one column left of current block 714.

The video coder may be configured to code (e.g., encode or decode) current block 714 using DC intra mode prediction using the determined samples. For example, video decoder 300 may be configured to generate a prediction block based on the plurality of samples, determine a residual block, the residual block indicating a difference between current block 714 and the prediction block, and reconstruct current block 714 based on the residual block and the prediction block. Video encoder 200 may be configured to generate a prediction block based on the plurality of samples, determine a residual block, the residual block indicating a difference between current block 714 and the prediction block, and signal information indicative of the residual block.

In the above description, sample 722 is aligned with last column of current block 714 and sample 726 is aligned with last row of current block 714. In some examples, the non-adjacent row of samples (e.g., row 716) having the last sample 722 that is in same column as the last column of current block 714 includes a first sample 720 that is in same column as a first column of current block 714. Also, in some examples, the non-adjacent column of samples (e.g., column 718) having the last sample 726 that is in same row as the last row of current block 714 includes a first sample 724 that is in same row as a first row of current block 714. There may be samples left of sample 720 and samples above sample 724. However, in some examples, for intra prediction, the samples from row 716 used for DC intra mode prediction may be limited to samples that align with the leftmost and rightmost columns of current block 714, and the samples from column 718 used for DC intra mode prediction may be limited to samples that align with topmost and bottommost rows of current block 714.

Current block 714 of FIG. 16 may be considered as a first block, and current block 728 of FIG. 17 may be considered as a second block. In some examples, the alignment of samples of current block 728 may be similar to aligned of current block 714; however, the row and column from which samples are utilized for DC intra mode prediction may be further away from current block 728 as compared to current block 714.

For example, a video coder (e.g., video encoder 200 or video decoder 300) may be configured to determine samples to use for DC intra prediction for current block 728 of FIG. 17. To determine the samples, the video coder may be configured to determine a plurality of samples in at least one of a non-adjacent row of samples (e.g., row 730 of FIG. 17) having a last sample 736 that is in same column as a last column of the current block 728 or a non-adjacent column of samples (e.g., column 732) having a last sample 740 that is in same row as a last row of current block 728.

For example, in FIG. 17, sample 736 is the last sample of the plurality of samples in row 730 that is in the same column as a last column of current block 728, and sample 740 is the last sample of the plurality of samples in column 732 that is in the same row as the last row of current block 728. There may be more samples to the right of sample 736 in row 730, and more samples below sample 740 in column 732. However, the samples used for DC intra prediction of current block 728 may not extend right of sample 736 in row 730 or below sample 740 in column 732. In FIG. 17, the non-adjacent row of samples (e.g., samples in row 730) is more than three rows above current block 728, and the non-adjacent column of samples (e.g., samples in column 732) is more than three columns left of current block 728.

The video coder may be configured to intra-prediction code (e.g., encode or decode) current block 728 based on the determined samples. For example, video decoder 300 may be configured to generate a prediction block based on the plurality of samples, determine a residual block, the residual block indicating a difference between current block 728 and the prediction block, and reconstruct current block 728 based on the residual block and the prediction block. Video encoder 200 may be configured to generate a prediction block based on the plurality of samples, determine a residual block, the residual block indicating a difference between current block 728 and the prediction block, and signal information indicative of the residual block.

In the above description, sample 736 is aligned with last column of current block 728 and sample 740 is aligned with last row of current block 728. In some examples, the non-adjacent row of samples (e.g., row 730) having the last sample 736 that is in same column as the last column of current block 728 includes a first sample 734 that is in same column as a first column of current block 728. Also, in some examples, the non-adjacent column of samples (e.g., column 732) having the last sample 740 that is in same row as the last row of current block 728 includes a first sample 738 that is in same row as a first row of current block 728. There may be samples left of sample 734 and samples above sample 738. However, in some examples, for intra prediction, the samples from row 730 used for DC intra mode prediction may be limited to samples that align with the leftmost and rightmost columns of current block 728, and the samples from column 732 used for DC intra mode prediction may be limited to samples that align with topmost and bottommost rows of current block 728.

In the examples of FIGS. 16 and 17, for MRLIdx greater than zero, a video coder may use reference samples that are aligned with the block boundaries for DC prediction. Let (x0, y0) denote the position of the top-left sample of the current block 714 or current block 728, and nW and nH denote the width and height of current block 714 or 728, respectively. Let MRLIdx denote the index to the reference line. The top reference samples used for the DC prediction may include samples at the following locations: (x, y0−MRLIdx−1), where x=x0 . . . x0+nW−1. The left reference samples used for the DC prediction may include samples at the following locations: (x0−MRLIdx−1, y), where y=y0 . . . y0+nH−1. For example, the reference samples used for MRLIdx equal to 1 and MRLIdx equal to 3 are shown in FIGS. 16 and 17, respectively.

Figure 19:
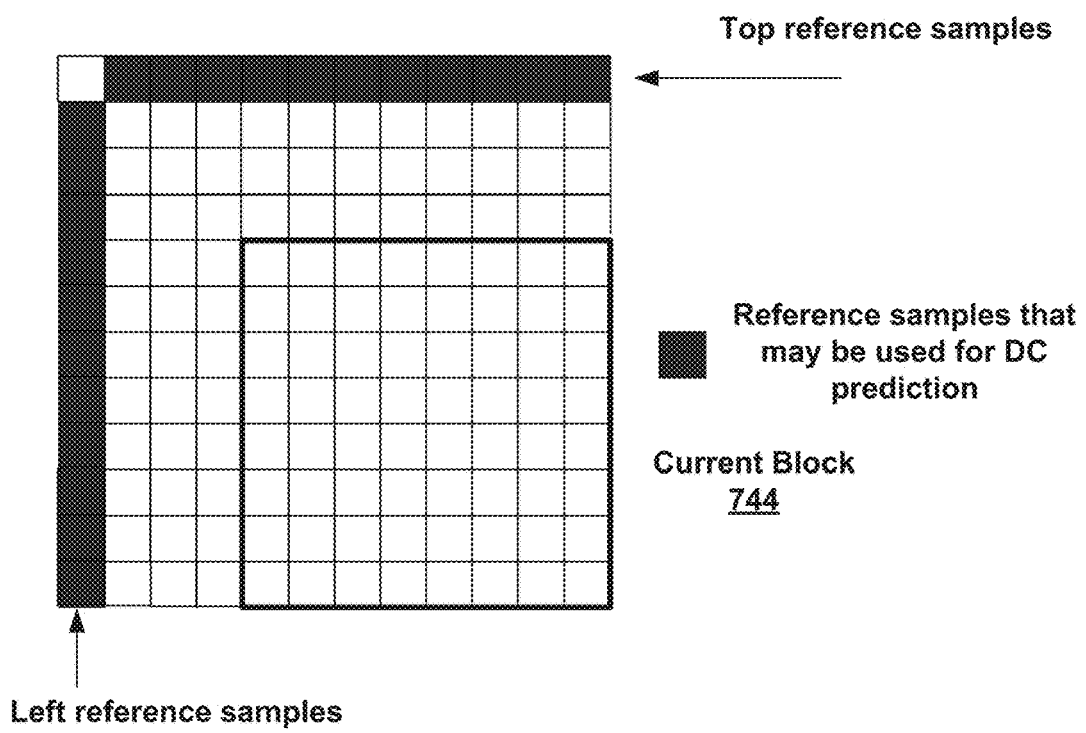

For MRLIdx greater than zero, a video coder may use reference samples that are aligned with the block boundaries for DC prediction and in addition more reference samples for more accurate prediction. Let (x0, y0) denote the position of the top-left sample of the current block, and nW and nH denote the width and height of the block. Let MRLIdx denote the index to the reference line. The top reference samples used for the DC prediction may include samples at the following locations: (x−MRLIdx, y0−MRLIdx−1), where x=x0 . . . x0+nW+MRLIdx−1. The left reference samples used for the DC prediction include samples at the following locations: (x0−MRLIdx−1, y−MRLIdx), where y=y0 . . . y0+nH+MRLIdx−1. For example, the reference samples used for MRLIdx equal to 1 and MRLIdx equal to 3 are shown in FIG. 19 with current block 742 and FIG. 20 with current block 744, respectively.

In some examples, the reference sample at position (x0−MRLIdx−1, y0−MRLIdx−1) may be used along with the top or left of both top and left reference samples in the calculation of the DC value for the current block. The video coder may use a weighted average of the reference samples, weights determined by one or more of the following factors: block size, aspect ratio, width, height, MRLIdx, intra mode of neighbouring blocks, etc.

Let valSumTop be the sum of the reference sample values top of the current block used for DC prediction for the particular MRLIdx. Let valSumLeft be the sum of the reference sample values left of the current block used for DC prediction for the particular MRLIdx. The DC value used for DC intra prediction is obtained as follows: dcVal= (wT*valSumTop+wL*valSumLeft+off)>>sh, where off denotes an offset and sh denotes a shift (in some examples, the above calculation using off and sh may be replaced by a division operation). wT and wL are weights associated with the top and left reference samples and may be derived as a function of the block characteristics. For example, wT and wL may be specified as follows:

| Weight | MRLIdx = 0 | MRLIdx = 1 | MRLIdx = 3 |
|---|---|---|---|
| wT | nW > nH ? 4: ((nW < nH) ? 0: 2) | nW > nH ? 3: ((nW < nH) ? 1: 2) | 2 |
| wL | nW < nH ? 4: ((nW > nH) ? 0: 2) | nW < nH ? 3: ((nW > nH) ? 1: 2) | 2 |

The value of off and sh may be dependent on the values of wT, wL, nW, and nH. In the above example, sh=2+ ((nW>nH)? Log 2(nW):(nW<nH? Log 2(nH):Log 2(2*nW)), off=1<<(sh−1).

In some examples, the DC values obtained from different weights may be considered in separate DC modes. For instance, a plurality of DC modes may be defined, where each DC mode may refer to a particular set of weights used for the top and left reference samples. In some examples, the reference samples positions used in the DC value calculation may be considered in separate DC modes. A plurality of DC modes may be defined, where each DC mode may refer to particular set of neighbors to be used for the top and left reference samples.

The following references may also provide some information for intra prediction: S. De Luxán Hernández, H. Schwarz, D. Marpe, T. Wiegand (HHI) "CE3: Line-based intra coding mode," JVET-L0076, S. De Luxán Hernández, V. George, J. Ma, T. Nguyen, H. Schwarz, D. Marpe, T. Wiegand (HHI), "CE3: Intra Sub-Partitions Coding Mode,"

JVET-M0102, J. Chen, Y. Ye, S. H. Kim, "Algorithm description for Versatile Video Coding and Test Model 3 (VTM3)," JVET-L1002, Macao, CN, October 2018, F. Bossen, K. Misra, "Non-CE3: A unified luma intra mode list construction process," JVET-M0528, and J. Yao, J. Zhu, W. Cai, K. Kazui, "Non-CE3: Intra prediction information coding," JVET-M0210.

The following is an example technique where the reference samples that may be used for DC prediction are aligned with the top and left boundaries of the predicted block (e.g., such as in FIGS. 16 and 17). The following are the proposed changes to the specification (e.g. VVC Draft 5). The double brackets ([[ . . . ]]) with bolding indicate removal/deletion.

8.4.5.2.12 Specification of INTRA_DC intra prediction mode

Inputs to this process are:
a variable nTbW specifying the transform block width,
a variable nTbH specifying the transform block height,
a variable refIdx specifying the intra prediction reference line index,
the neighbouring samples p[x][y], with x=−1−refIdx, y=−1−refIdx . . . nTbH [[−refIdx]]−1 and x=−refIdx . . . nTbW−1 [[−refIdx]], y=−1−refIdx.

Outputs of this process are the predicted samples predSamples[x][y], with x=0 . . . nTbW−1, y=0 . . . nTbH−1.

The values of the prediction samples predSamples[x][y], with x=0 . . . nTbW−1, y=0 . . . nTbH−1, are derived by the following ordered steps:

3. A variable dcVal is derived as follows:
When nTbW is equal to nTbH:

$$dc\text{Val}=(\Sigma_{x'=0}^{nTbW-1} p[x'[[-\text{refIdx}]]][-1-\text{refIdx}]+ \\ \Sigma_{y'=0}^{nTbH-1} p[-1-\text{refIdx}][y'[[-\text{refIdx}]]]+nTbW)>> \\ (\text{Log 2}(nTbW)+1) \quad (8\text{-}114)$$

When nTbW is greater than nTbH:

$$dc\text{Val}=(\Sigma_{x'=0}^{nTbW-1} p[x'[[-\text{refIdx}]]][-1-\text{refIdx}]+ \\ (nTbW>>1))>>\text{Log 2}(nTbW) \quad (8\text{-}115)$$

When nTbW is less than nTbH:

$$dc\text{Val}=(\Sigma_{y'=0}^{nTbH-1} p[-1-\text{refIdx}][y'[[-\text{refIdx}]]]+ \\ (nTbH>>1))>>\text{Log 2}(nTbH) \quad (8\text{-}116)$$

4. The prediction samples predSamples[x][y] are derived as follows:

$$\text{predSamples}[x][y]=dc\text{Val, with } x=0 \ldots nTbW-1, \\ y=0 \ldots nTbH-1 \quad (8\text{-}117)$$

FIG. 19 is a flowchart illustrating an example method for encoding a current block. The current block may comprise a current CU. Although described with respect to video encoder 200 (FIGS. 1 and 3), it should be understood that other devices may be configured to perform a method similar to that of FIG. 19. Memory (e.g., memory 106, video data memory 230, DPB 218, or some other memory) may be configured to store one or more samples of rows or columns that are non-adjacent to a current block.

Processing circuitry of video encoder 200 (e.g., processing circuitry includes intra-prediction unit 226, mode selection unit 202, and one or more other components of video encoder 200) may be configured to determine samples to use for DC intra mode prediction for a current block, where to determine the samples, the processing circuitry may be configured to determine a plurality of samples in at least one of a non-adjacent row of samples having a last sample that is in same column as a last column of the current block, wherein the non-adjacent row of samples is more than one row above the current block, or a non-adjacent column of samples having a last sample that is in same row as a last row of the current block, wherein the non-adjacent column of samples is more than one column left of the current block (800). In some examples, the non-adjacent row of samples having the last sample that is in same column as the last column of the current block includes a first sample that is in same column as a first column of the current block, and/or the non-adjacent column of samples having the last sample that is in same row as the last row of the current block includes a first sample that is in same row as a first row of the current block.

As one example, a coordinate for a top-left sample of the current block is (x0, y0), nW is width of the current block, and nH is height of the current block, and MRLIdx is indicative of a number of rows or columns the non-adjacent row of samples is above the current block or the non-adjacent column of samples is left of the current block. The processing circuitry of video encoder 200 may be configured to determine at least one of the non-adjacent row of samples having coordinates (x, y0−MRLIdx−1), where x=x0 . . . x0+nW−1, or the non-adjacent column of samples having coordinates (x0−MRLIdx−1, y), where y=y0 . . . y0+nH−1.

The processing circuitry of video encoder 200 may generate a prediction block based on the plurality of samples (802). The processing circuitry of video encoder 200 may determine a residual block indicative of a difference between the prediction block and current block (804). The processing circuitry of video encoder 200 may signal information indicative of the residual block (806). The processing circuitry of video encoder 200 may also signal a syntax element (e.g., MRLIdx) indicative of a number of rows or columns the non-adjacent row of samples is above the current block or the non-adjacent column of samples is left of the current block (808).

Figure 20:
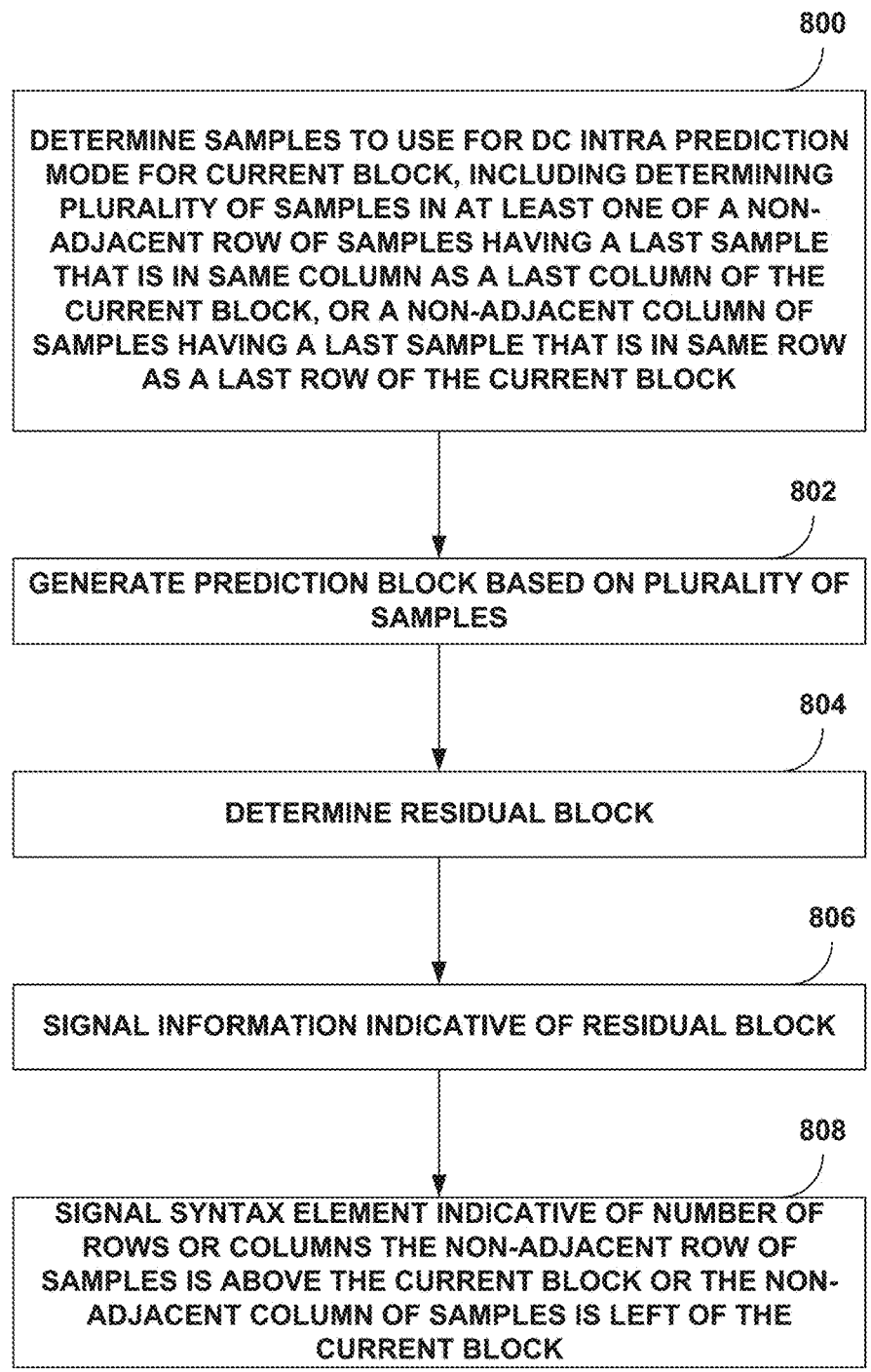
FIG. 20 is a flowchart illustrating an example method of encoding video data.
Figure 21:
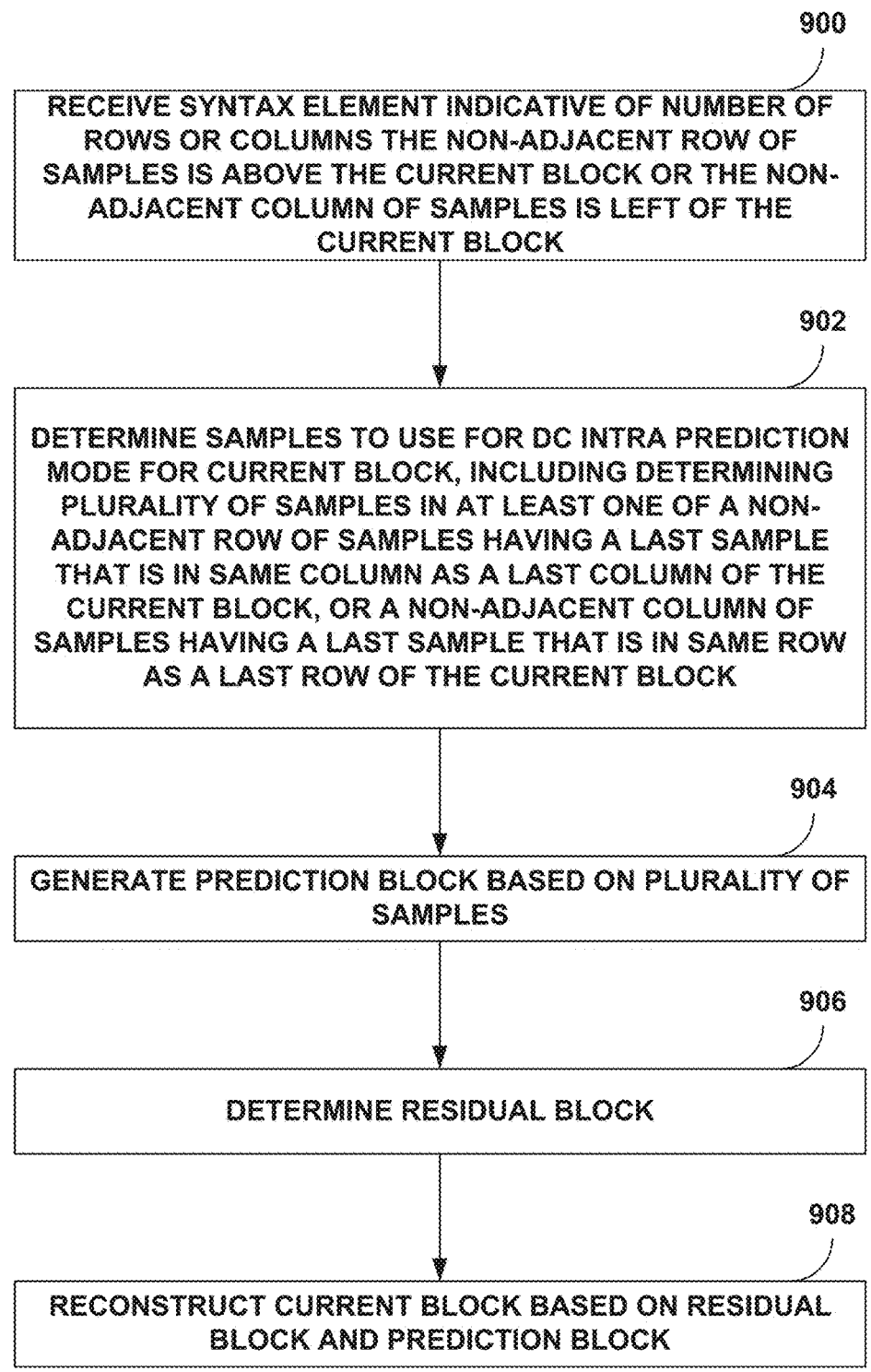
FIG. 21 is a flowchart illustrating an example method of decoding video data.

FIG. 20 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 20. Memory (e.g., memory 120, CPB memory 320, DPB 314, or some other memory) may be configured to store one or more samples of rows or columns that are non-adjacent to a current block. The processing circuitry of video decoder 300 may receive a syntax element (e.g., MRLIdx) indicative of a number of rows or columns a non-adjacent row of samples is above the current block or a non-adjacent column of samples is left of the current block (900).

Processing circuitry of video decoder 300 (e.g., processing circuitry includes intra-prediction unit 318, prediction processing unit 304, and one or more other components of video decoder 300) may be configured to determine samples to use for DC intra mode prediction for a current block, where to determine the samples, the processing circuitry may be configured to determine a plurality of samples in at least one of a non-adjacent row of samples having a last sample that is in same column as a last column of the current block, wherein the non-adjacent row of samples is more than one row above the current block, or a non-adjacent column of samples having a last sample that is in same row as a last row of the current block, wherein the non-adjacent column of samples is more than one column left of the current block (902). In some examples, the non-adjacent row of samples having the last sample that is in same column as the last column of the current block includes a first sample that is in same column as a first column of the current block, and/or the non-adjacent column of samples having the last sample that is in same row as the last row of the current block includes a first sample that is in same row as a first row of the current block.

As one example, a coordinate for a top-left sample of the current block is (x0, y0), nW is width of the current block, and nH is height of the current block, and MRLIdx is indicative of a number of rows or columns the non-adjacent row of samples is above the current block or the non-adjacent column of samples is left of the current block. The processing circuitry of video decoder 300 may be configured to determine at least one of the non-adjacent row of samples having coordinates (x, y0−MRLIdx−1), where x=x0 . . . x0+nW−1, or the non-adjacent column of samples having coordinates (x0−MRLIdx−1, y), where y=y0 . . . y0+nH−1.

The processing circuitry of video decoder 300 may generate a prediction block based on the plurality of samples (904). The processing circuitry of video decoder 300 may determine a residual block indicative of a difference between the prediction block and current block (906). The processing circuitry of video decoder may reconstruct the current block based on the residual block and the prediction block (908).

One or more examples are described below. The example techniques may be used alone or in combination.

Example 1

A method of coding video data, the method comprising determining samples to use for DC intra mode prediction for a current block, wherein determining the samples comprises determining a plurality of samples in a non-adjacent row or a non-adjacent column having a last sample in the non-adjacent row that is in same column as last column of the current block or having a last sample in the non-adjacent column that is in same row as last row of the current block and intra-prediction coding the current block based on the determined samples.

Example 2

The method of example 1, wherein intra-prediction coding comprises intra-prediction decoding the current block.

Example 3

The method of example 2, wherein intra-prediction decoding comprises determining a prediction block based on the plurality of samples, determining a residual block, the residual block indicating a difference between the current block and the prediction block, and reconstructing the current block based on the residual block and the prediction block.

Example 4

The method of example 1, wherein intra-prediction coding comprises intra-prediction encoding the current block.

Example 5

The method of example 4, wherein intra-prediction encoding comprises determining a prediction block based on the plurality of samples, determining a residual block, the residual block indicating a different between the current block and the prediction block, and signaling information indicative of the residual block.

Example 6

The method of any of examples 1-5, wherein the plurality of samples in the non-adjacent row or the non-adjacent column having the last sample in the non-adjacent row that is in same column as last column of the current block or having the last sample in the non-adjacent column that is in same row as last row of the current block comprise plurality of samples in the non-adjacent row or the non-adjacent column having a first sample in the non-adjacent row that is in same column as first column of the current block or having a first sample in the non-adjacent column that is in same row as first row of the current block.

Example 7

The method of any of examples 1-5, wherein the plurality of samples in the non-adjacent row or the non-adjacent column having the last sample in the non-adjacent row that is in same column as last column of the current block or having the last sample in the non-adjacent column that is in same row as last row of the current block comprise plurality of samples in the non-adjacent row or the non-adjacent column having a first sample in the non-adjacent row that is in a column left of first column of the current block or having a first sample in the non-adjacent column that is in a row above first row of the current block.

Example 8

A device for coding video data, the device comprising memory configured to store one or more samples of rows and columns that are non-adjacent to a current block and a video coder comprising at least one of fixed-function or programmable circuitry, wherein the video coder is configured to perform the method of any one or combination of examples 1-7.

Example 9

The device of example 8, further comprising a display configured to display decoded video data.

Example 10

The device of any of examples 8 and 9, wherein the device comprises one or more of a camera, a computer, a mobile device, a broadcast receiver device, or a set-top box.

Example 11

A computer-readable storage medium having stored thereon instructions that, when executed, cause one or more processors to perform the method of any of examples 1-7.

Example 12 device for coding video data, the device comprising means for performing the method of any of examples 1-7.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    determining samples for generating a DC value to use for DC intra mode prediction for a current block, wherein determining the samples comprises determining a plurality of samples in at least one of:
        a non-adjacent row of samples having a last sample that is in the same column as a last column of the current block and a first sample that is in the same column as a first column of the current block, wherein the non-adjacent row of samples is more than one row above the current block, and wherein the non-adjacent row of samples includes only the first sample that is in the same column as the first column of the current block, the last sample that is in the same column as the last column of the current block, and samples in the non-adjacent row between the first sample that is in the same column as the first column of the current block and the last sample that is in the same column as the last column of the current block, or
        a non-adjacent column of samples having a last sample that is in the same row as a last row of the current block and a first sample that is in the same row as a first row of the current block, wherein the non-adjacent column of samples is more than one column left of the current block, and wherein the non-adjacent column of samples includes only the first sample that is in the same row as the first row of the current block, the last sample that is in the same row as the last row of the current block, and samples in the non-adjacent column between the first sample that is in the same row as the first row of the current block and the last sample that is in the same row as the last row of the current block; and
    decoding the current block using DC intra mode prediction using the DC value.

2. The method of claim 1, wherein the current block comprises a first block, the non-adjacent row of samples comprises a first non-adjacent row of samples, and the non-adjacent column of samples comprises a first non-adjacent column of samples, the method further comprising:
    determining samples to use for DC intra mode prediction for a second block, wherein determining the samples to use for DC intra mode prediction for the second block comprises determining a plurality of samples in at least one of:
        a second non-adjacent row of samples having a first sample that is in first column of the second block and having a last sample that is in the same column as a last column of the second block, wherein the second non-adjacent row of samples is more than three rows above the second block, or
        a second non-adjacent column of samples having a first sample that is in first row of the second block and having a last sample that is in the same row as a last row of the second block, wherein the second non-adjacent column of samples is more than three columns left of the second block; and
    decoding the second block using DC intra mode prediction using the determined samples to use for DC intra mode prediction for the second block.

3. The method of claim 1, further comprising:
receiving a syntax element indicative of a number of rows or columns the non-adjacent row of samples is above the current block or the non-adjacent column of samples is left of the current block.

4. The method of claim 1, wherein a coordinate for a top-left sample of the current block is (x0,y0), nW is width of the current block, and nH is height of the current block, and MRLIdx is indicative of a number of rows or columns the non-adjacent row of samples is above the current block or the non-adjacent column of samples is left of the current block, the method further comprising determining at least one of:
the non-adjacent row of samples having coordinates (x, y0−MRLIdx−1), where x=x0 . . . x0+nW−1, or
the non-adjacent column of samples having coordinates (x0−MRLIdx−1, y), where y=y0 . . . y0+nH−1.

5. The method of claim 1, further comprising:
performing a weighted average of the determined samples,
wherein decoding the current block comprises decoding the current block using DC intra mode prediction using the weighted average of the determined samples.

6. The method of claim 1, wherein decoding comprises:
generating a prediction block based on the plurality of samples;
determining a residual block, the residual block indicating a difference between the current block and the prediction block; and
reconstructing the current block based on the residual block and the prediction block.

7. A method of encoding video data, the method comprising:
determining samples for generating a DC value to use for DC intra mode prediction for a current block, wherein determining the samples comprises determining a plurality of samples in at least one of:
a non-adjacent row of samples having a last sample that is in the same column as a last column of the current block and a first sample that is in the same column as a first column of the current block, wherein the non-adjacent row of samples is more than one row above the current block, and wherein the non-adjacent row of samples includes only the first sample that is in the same column as the first column of the current block, the last sample that is in the same column as the last column of the current block, and samples in the non-adjacent row between the first sample that is in the same column as the first column of the current block and the last sample that is in the same column as the last column of the current block, or
a non-adjacent column of samples having a last sample that is in the same row as a last row of the current block and a first sample that is in the same row as a first row of the current block, wherein the non-adjacent column of samples is more than one column left of the current block, and wherein the non-adjacent column of samples includes only the first sample that is in the same row as the first row of the current block, the last sample that is in the same row as the last row of the current block, and samples in the non-adjacent column between the first sample that is in the same row as the first row of the current block and the last sample that is in the same row as the last row of the current block; and
encoding the current block using DC intra mode prediction using the DC value.

8. The method of claim 7, wherein the current block comprises a first block, the non-adjacent row of samples comprises a first non-adjacent row of samples, and the non-adjacent column of samples comprises a first non-adjacent column of samples, the method further comprising:
determining samples to use for DC intra mode prediction for a second block, wherein determining the samples to use for DC intra mode prediction for the second block comprises determining a plurality of samples in at least one of:
a second non-adjacent row of samples having a first sample that is in first column of the second block and having a last sample that is in the same column as a last column of the second block, wherein the second non-adjacent row of samples is more than three rows above the second block, or
a second non-adjacent column of samples having a first sample that is in first row of the second block and having a last sample that is in the same row as a last row of the second block, wherein the second non-adjacent column of samples is more than three columns left of the second block; and
encoding the second block using DC intra mode prediction using the determined samples to use for DC intra mode prediction for the second block.

9. The method of claim 7, further comprising:
signaling a syntax element indicative of a number of rows or columns the non-adjacent row of samples is above the current block or the non-adjacent column of samples is left of the current block.

10. The method of claim 7, wherein a coordinate for a top-left sample of the current block is (x0,y0), nW is width of the current block, and nH is height of the current block, and MRLIdx is indicative of a number of rows or columns the non-adjacent row of samples is above the current block or the non-adjacent column of samples is left of the current block, the method further comprising determining at least one of:
the non-adjacent row of samples having coordinates (x, y0−MRLIdx−1), where x=x0 . . . x0+nW−1, or
the non-adjacent column of samples having coordinates (x0−MRLIdx−1, y), where y=y0 . . . y0+nH−1.

11. The method of claim 7, further comprising:
performing a weighted average of the determined samples,
wherein encoding the current block comprises encoding the current block using DC intra mode prediction using the weighted average of the determined samples.

12. The method of claim 7, wherein encoding comprises:
generating a prediction block based on the plurality of samples;
determining a residual block, the residual block indicating a difference between the current block and the prediction block; and
signaling information indicative of the residual block.

13. A device for decoding video data, the device comprising:
memory configured to store one or more samples of rows and columns that are non-adjacent to a current block; and
processing circuitry configured to:
determine samples for generating a DC value to use for DC intra mode prediction for a current block, wherein to determine the samples, the processing circuitry is configured to determine a plurality of samples in at least one of:
  a non-adjacent row of samples having a last sample that is in the same column as a last column of the current block and a first sample that is in the same column as a first column of the current block, wherein the non-adjacent row of samples is more than one row above the current block, and wherein the non-adjacent row of samples includes only the first sample that is in the same column as the first column of the current block, the last sample that is in the same column as the last column of the current block, and samples in the non-adjacent row between the first sample that is in the same column as the first column of the current block and the last sample that is in the same column as the last column of the current block, or
  a non-adjacent column of samples having a last sample that is in the same row as a last row of the current block and a first sample that is in the same row as a first row of the current block, wherein the non-adjacent column of samples is more than one column left of the current block, and wherein the non-adjacent column of samples includes only the first sample that is in the same row as the first row of the current block, the last sample that is in the same row as the last row of the current block, and samples in the non-adjacent column between the first sample that is in the same row as the first row of the current block and the last sample that is in the same row as the last row of the current block; and
decode the current block using DC intra mode prediction using the DC value.

14. The device of claim 13, wherein the current block comprises a first block, the non-adjacent row of samples comprises a first non-adjacent row of samples, and the non-adjacent column of samples comprises a first non-adjacent column of samples, the processing circuitry is configured to:
  determine samples to use for DC intra mode prediction for a second block, wherein to determine the samples to use for DC intra mode prediction for the second block, the processing circuitry is configured to determine a plurality of samples in at least one of:
    a second non-adjacent row of samples having a first sample that is in first column of the second block and having a last sample that is in the same column as a last column of the second block, wherein the second non-adjacent row of samples is more than three rows above the second block, or
    a second non-adjacent column of samples having a first sample that is in first row of the second block and having a last sample that is in the same row as a last row of the second block, wherein the second non-adjacent column of samples is more than three columns left of the second block; and
  decode the second block using DC intra mode prediction using the determined samples to use for DC intra mode prediction for the second block.

15. The device of claim 13, wherein the processing circuitry is configured to:
  receive a syntax element indicative of a number of rows or columns the non-adjacent row of samples is above the current block or the non-adjacent column of samples is left of the current block.

16. The device of claim 13, wherein a coordinate for a top-left sample of the current block is (x0,y0), nW is width of the current block, and nH is height of the current block, and MRLIdx is indicative of a number of rows or columns the non-adjacent row of samples is above the current block or the non-adjacent column of samples is left of the current block, the processing circuitry is configured to determine at least one of:
  the non-adjacent row of samples having coordinates (x, y0−MRLIdx−1), where x=x0 . . . x0+nW−1, or
  the non-adjacent column of samples having coordinates (x0−MRLIdx−1, y), where y=y0 . . . y0+nH−1.

17. The device of claim 13, wherein the processing circuitry is configured to:
  perform a weighted average of the determined samples, wherein to decode the current block, the processing circuitry is configured to decode the current block using DC intra mode prediction using the weighted average of the determined samples.

18. The device of claim 13, wherein to decode, the processing circuitry is configured to:
  generate a prediction block based on the plurality of samples;
  determine a residual block, the residual block indicating a difference between the current block and the prediction block; and
  reconstruct the current block based on the residual block and the prediction block.

19. The device of claim 13, further comprising a display configured to display decoded video data.

20. The device of claim 13, wherein the device comprises one or more of a camera, a computer, a mobile device, a broadcast receiver device, or a set-top box.

21. A device for encoding video data, the device comprising:
  memory configured to store one or more samples of rows and columns that are non-adjacent to a current block; and
  processing circuitry configured to:
    determine samples for generating a DC value to use for DC intra mode prediction for a current block, wherein to determine the samples, the processing circuitry is configured to determine a plurality of samples in at least one of:
      a non-adjacent row of samples having a last sample that is in the same column as a last column of the current block and a first sample that is in the same column as a first column of the current block, wherein the non-adjacent row of samples is more than one row above the current block, and wherein the non-adjacent row of samples includes only the first sample that is in the same column as the first column of the current block, the last sample that is in the same column as the last column of the current block, and samples in the non-adjacent row between the first sample that is in the same column as the first column of the current block and the last sample that is in the same column as the last column of the current block, or
      a non-adjacent column of samples having a last sample that is in the same row as a last row of the current block and a first sample that is in the same row as a first row of the current block, wherein the non-adjacent column of samples is more than one column left of the current block, and wherein the non-adjacent column of samples includes only the first sample that is in the same row as the first row of the current block, the last sample that is in the same row as the last row of the current block, and samples in the non-adjacent column between the first sample that is in the same row as the first row of the current block and the last sample that is in the same row as the last row of the current block; and encode the current block using DC intra mode prediction using the DC value.

22. The device of claim 21, wherein to encode, the processing circuitry is configured to:

generate a prediction block based on the plurality of samples;

determine a residual block, the residual block indicating a difference between the current block and the prediction block; and signal information indicative of the residual block.

23. A non-transitory computer-readable storage medium storing instructions thereon that when executed cause one or more processors to:

determine samples for generating a DC value to use for DC intra mode prediction for a current block, wherein the instructions that cause the one or more processors to determine the samples comprise instructions that cause the one or more processors to determine a plurality of samples in at least one of:

a non-adjacent row of samples having a last sample that is in the same column as a last column of the current block and a first sample that is in the same column as a first column of the current block, wherein the non-adjacent row of samples is more than one row above the current block, and wherein the non-adjacent row of samples includes only the first sample that is in the same column as the first column of the current block, the last sample that is in the same column as the last column of the current block, and samples in the non-adjacent row between the first sample that is in the same column as the first column of the current block and the last sample that is in the same column as the last column of the current block, or a non-adjacent column of samples having a last sample that is in the same row as a last row of the current block and a first sample that is in the same row as a first row of the current block, wherein the non-adjacent column of samples is more than one column left of the current block, and wherein the non-adjacent column of samples includes only the first sample that is in the same row as the first row of the current block, the last sample that is in the same row as the last row of the current block, and samples in the non-adjacent column between the first sample that is in the same row as the first row of the current block and the last sample that is in the same row as the last row of the current block; and decode the current block using DC intra mode prediction using the DC value.

24. A device for decoding video data, the device comprising:

means for determining samples for generating a DC value to use for DC intra mode prediction for a current block, wherein the means for determining the samples comprises means for determining a plurality of samples in at least one of:

a non-adjacent row of samples having a last sample that is in the same column as a last column of the current block and a first sample that is in the same column as a first column of the current block, wherein the non-adjacent row of samples is more than one row above the current block, and wherein the non-adjacent row of samples includes only the first sample that is in the same column as the first column of the current block, the last sample that is in the same column as the last column of the current block, and samples in the non-adjacent row between the first sample that is in the same column as the first column of the current block and the last sample that is in the same column as the last column of the current block, or a non-adjacent column of samples having a last sample that is in the same row as a last row of the current block and a first sample that is in the same row as a first row of the current block, wherein the non-adjacent column of samples is more than one column left of the current block, and wherein the non-adjacent column of samples includes only the first sample that is in the same row as the first row of the current block, the last sample that is in the same row as the last row of the current block, and samples in the non-adjacent column between the first sample that is in the same row as the first row of the current block and the last sample that is in the same row as the last row of the current block; and means for decoding the current block using DC intra mode prediction using the DC value.

* * * * *